(12) United States Patent
Papasakellariou

(10) Patent No.: US 11,425,707 B2
(45) Date of Patent: Aug. 23, 2022

(54) MONITORING OF DOWNLINK CONTROL CHANNELS FOR COMMUNICATION WITH MULTIPLE TRANSMISSION-RECEPTION POINTS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 16/946,506

(22) Filed: Jun. 24, 2020

(65) Prior Publication Data

US 2021/0014837 A1 Jan. 14, 2021

Related U.S. Application Data

(60) Provisional application No. 62/871,494, filed on Jul. 8, 2019.

(51) Int. Cl.
*H04W 72/04* (2009.01)
(52) U.S. Cl.
CPC .................. *H04W 72/042* (2013.01)
(58) Field of Classification Search
CPC ..... H04L 5/0058; H04L 5/001; H04L 5/0053; H04L 5/0055; H04L 5/0051;
(Continued)

(56) References Cited

U.S. PATENT DOCUMENTS

2018/0048447 A1* 2/2018 Nogami ................ H04L 5/0057
2019/0222357 A1* 7/2019 Huang ............... H04W 72/0446
(Continued)

FOREIGN PATENT DOCUMENTS

KR 10-2019-0017675 A 2/2019

OTHER PUBLICATIONS

International Search Report and Written Opinion of the International Searching Authority in connection with International Application No. PCT/KR2020/008925 dated Sep. 28, 2020, 9 pages.
(Continued)

*Primary Examiner* — Chi Ho A Lee

(57) ABSTRACT

Methods and apparatuses for PDCCH candidate indication and determination. A method of operating a UE includes transmitting a first capability value and receiving a configuration of $N_{cells}^{DL,\mu}$ downlink cells scheduled by PDCCHs with SCS configuration μ and a configuration of a first group index for first CORESETs and of a second group index for second CORESETs per cell for $N_{cells,1}^{DL,\mu}$ cells from the $N_{cells}^{DL,\mu}$. The method further includes determining a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ cells for each SCS configuration μ, where $N_{cells,0}^{DL,\mu}=N_{cells}^{DL,\mu}-N_{cells,1}^{DL,\mu}$. The method also includes receiving, per cell from the $N_{cells}^{DL,\mu}$ cells and per slot, a number of PDCCH candidates that is not larger than the minimum of: the total number $M_{PDCCH}^{total,slot,\mu}$ of PDCCH candidates per slot and a maximum predefined number $M_{PDCCH}^{max,slot,\mu}$ of PDCCH candidates per slot.

20 Claims, 9 Drawing Sheets

(58) Field of Classification Search
CPC ... H04L 5/0048; H04L 5/0007; H04L 5/0035; H04W 72/042; H04W 72/04
See application file for complete search history.

(56) References Cited

U.S. PATENT DOCUMENTS

| | | | |
|---|---|---|---|
| 2020/0154295 A1* | 5/2020 | Lin | H04W 76/28 |
| 2020/0220691 A1* | 7/2020 | Gao | H04L 5/001 |
| 2020/0221428 A1 | 7/2020 | Moon et al. | |
| 2020/0314678 A1* | 10/2020 | Lee | H04L 1/0038 |
| 2021/0014837 A1* | 1/2021 | Papasakellariou | H04W 72/042 |
| 2021/0144599 A1* | 5/2021 | Awoniyi-Oteri | H04L 5/0053 |
| 2021/0144756 A1* | 5/2021 | Wang | H04W 52/00 |
| 2021/0306986 A1* | 9/2021 | Takahashi | H04W 72/0453 |
| 2021/0320821 A1* | 10/2021 | Lee | H04L 25/0204 |
| 2022/0052828 A1* | 2/2022 | Yiu | H04W 76/28 |
| 2022/0070839 A1* | 3/2022 | Khoshnevisan | H04W 72/085 |

OTHER PUBLICATIONS

Huawei, et al., "Remaining details for DL design on multi-TRP/panel transmission for eMBB," R1-1906040, 3GPP TSG RAN WG1 Meeting #97, Reno, USA, May 13-17, 2019, 7 pages.

NTT Docomo, Inc, "Enhancements on multi-TRP/panel transmission," R1-1906224, 3GPP TSG RAN WG1 Meeting #97, Reno, USA, May 13-17, 2019, 32 pages.

Samsung, "PDCCH Monitoring for NR-DC," R1-1904388, 3GPP TSG RAN WG1 Meeting #96bis, Xian, China, Apr. 8-12, 2019, 2 pages.

Vivo, "Discussion on multi PDCCH based multi TRP transmission," R1-1900137, 3GPP TSG RAN WG1 Ad-Hoc Meeting #1901, Taipei, Jan. 21-25, 2019, 15 pages.

"5G; NR; Physical channels and modulation (3GPP TS 38.211 version 15.6.0 Release 15)", ETSI TS 138 211 V15.6.0, Jul. 2019, 100 pages.

"5G; NR; Multiplexing and channel coding (3GPP TS 38.212 version 15.6.0 Release 15)", ETSI TS 138 212 V15.6.0, Jul. 2019, 106 pages.

"5G; NR; Physical layer procedures for control (3GPP TS 38.213 version 15.6.0 Release 15)", ETSI TS 138 213 V15.6.0, Jul. 2019, 110 pages.

"5G; NR; Physical layer procedures for data (3GPP TS 38.214 version 15.6.0 Release 15)", ETSI TS 138 214 V15.6.0, Jul. 2019, 108 pages.

"5G; NR; Medium Access Control (MAC) protocol specification (3GPP TS 38.321 version 15.6.0 Release 15)", ETSI TS 138 321 V15.6.0, Jul. 2019, 80 pages.

"5G; NR; Radio Resource Control (RRC); Protocol specification (3GPP TS 38.331 version 15.6.0 Release 15)", ETSI TS 138 331 V15.6.0, Jul. 2019, 516 pages.

Extended European Search Report issued Jun. 24, 2022 regarding Application No. 20836884.5, 7 pages.

Qualcomm Incorporated, "Multi-TRP Enhancements", 3GPP TSG-RAN WG1 Meeting #97, R1-1907289, May 2019, 25 pages.

Xiaomi, "Enhancements on Multi-TRP/Panel Transmission", 3GPP TSG RAN WG1 #97, R1-1907442, May 2019, 4 pages.

\* cited by examiner

MONITORING OF DOWNLINK CONTROL CHANNELS FOR COMMUNICATION WITH MULTIPLE TRANSMISSION-RECEPTION POINTS

CROSS-REFERENCE TO RELATED APPLICATIONS AND CLAIM OF PRIORITY

This application claims priority to U.S. Provisional Patent Application No. 62/871,494 filed Jul. 8, 2019, the disclosure of which is incorporated herein by reference in its entirety.

TECHNICAL FIELD

The present disclosure relates to wireless communication systems. More particularly, the present disclosure relates to transmissions of Physical Downlink Control Channels (PDCCHs) from multiple transmission/reception points (TRPs) to a user equipment (UE).

BACKGROUND

There is a demand for an improved 5G communication system. The 5G communication system is implemented in higher frequency (mmWave) bands, for example 30 GHz bands, to enable higher data rates. A user equipment (UE) can communicate with multiple TRPs, referred to as multi-TRP communication. TRPs can belong to a same cell and a UE can receive or transmit same or different transport blocks to different TRPs. Multi-TRP communication can enhance data rates or reliability for communications by providing time, frequency, or spatial diversity for transmission and reception of control or data information. For example, a UE can receive from different TRPs different transport blocks through spatial multiplexing to increase data rates or a same transport block to increase reception robustness and improve reception reliability. However, when a UE is configured for multi-TRP communication, the UE must monitor the physical downlink control channel (PDCCH) from multiple TRPs. Monitoring the PDCCH from multiple TRPs presents various challenges.

SUMMARY

The present disclosure relates to monitoring downlink control channels for communication with multiple TRPs.

In one embodiment, a user equipment (UE) is provided. The UE includes a transmitter configured to transmit a first capability value and a receiver configured to receive a configuration of $N_{cells}^{DL,\mu}$ downlink cells scheduled by physical downlink control channels (PDCCHs) with a subcarrier spacing (SCS) configuration $\mu$ and a configuration of a first group index for first control resource sets (CORESETs) and of a second group index for second CORESETs per cell for $N_{cells,1}^{DL,\mu}$ cells from the $N_{cells}^{DL,\mu}$. The UE further includes a processor, operably connected to the receiver, configured to determine a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ cells for each SCS configuration $\mu$, where $N_{cells,0}^{DL,\mu} = N_{cells}^{DL,\mu} - N_{cells,1}^{DL,\mu}$. The receiver is further configured to receive, per cell from the $N_{cells}^{DL,\mu}$ cells and per slot, a number of PDCCH candidates that is not larger than a minimum of: the total number $M_{PDCCH}^{total,slot,\mu}$ of PDCCH candidates per slot and a maximum predefined number $M_{PDCCH}^{max,slot,\mu}$ of PDCCH candidates per slot.

In another embodiment, a base station is provided. The base station includes a receiver configured to receive a first capability value and a transmitter configured to transmit a configuration of $N_{cells}^{DL,\mu}$ downlink cells scheduled by PDCCHs with a SCS configuration $\mu$ and a configuration of a first group index for first CORESETs and of a second group index for second CORESETs per cell for $N_{cells,1}^{DL,\mu}$ cells from the $N_{cells}^{DL,\mu}$. The base station further includes a processor, operably connected to the transmitter, configured to determine a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ for each SCS configuration $\mu$, where $N_{cells,0}^{DL,\mu} = N_{cells}^{DL,\mu} - N_{cells,1}^{DL,\mu}$.

In yet another embodiment, a method for a UE to determine a maximum number of PDCCH candidates to receive per cell and per slot is provided. The method includes transmitting a first capability value and receiving a configuration of $N_{cells}^{DL,\mu}$ downlink cells scheduled by PDCCHs with a SCS configuration $\mu$ and a configuration of a first group index for first CORESETs and of a second group index for second CORESETs per cell for $N_{cells,1}^{DL,\mu}$ cells from the $N_{cells}^{DL,\mu}$. The method further includes determining a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ cells for each SCS configuration $\mu$, where $N_{cell}^{DL,\mu} = N_{cells}^{DL,\mu} - N_{cells,1}^{DL,\mu}$. The method also includes receiving, per cell from the $N_{cells}^{DL,\mu}$ cells and per slot, a number of PDCCH candidates that is not larger than the minimum of: the total number $M_{PDCCH}^{total,slot,\mu}$ of PDCCH candidates per slot and a maximum predefined number $M_{PDCCH}^{max,slot,\mu}$ of PDCCH candidates per slot.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
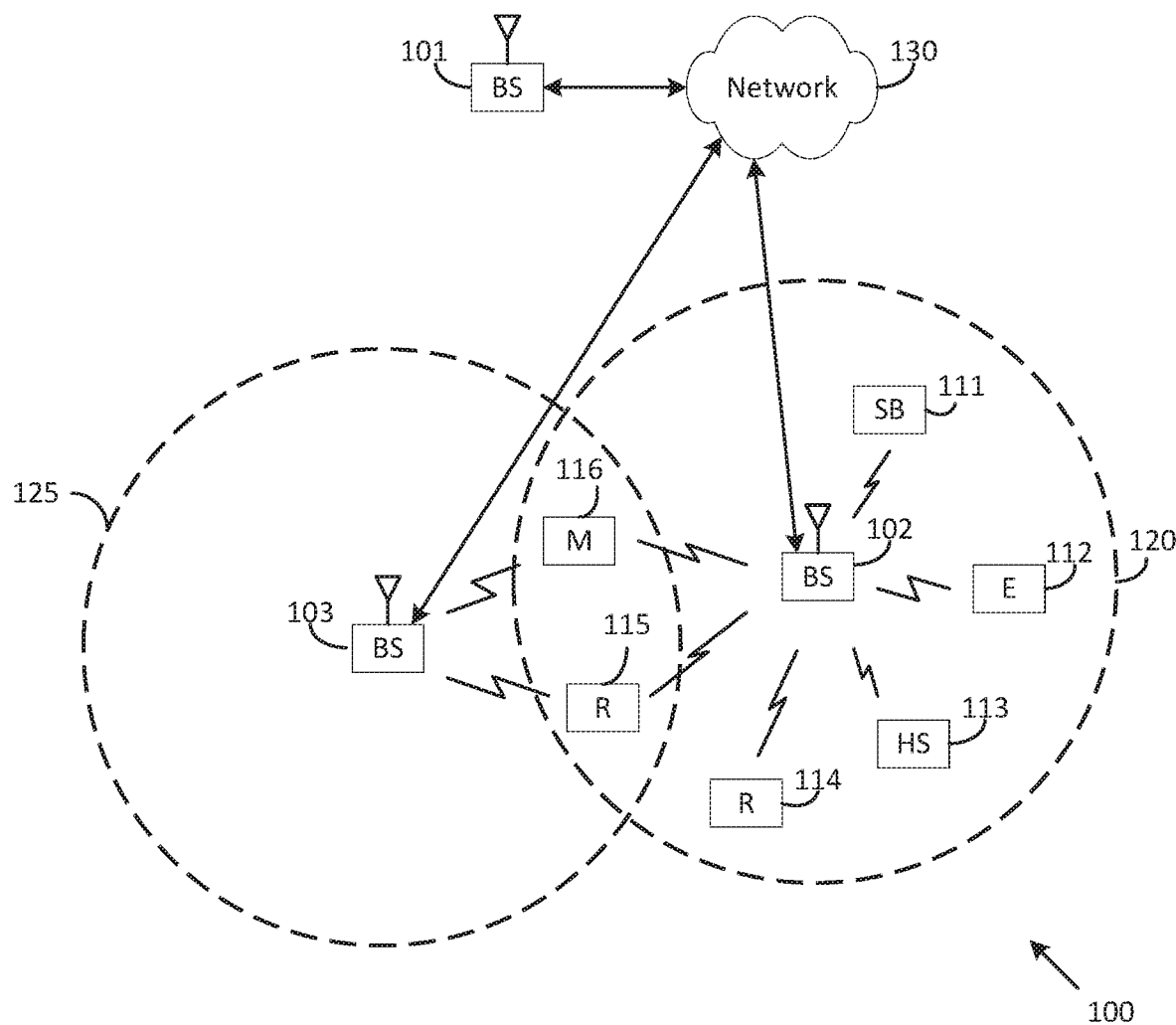
FIG. 1 illustrates an example wireless network according to embodiments of the present disclosure.

FIGS. 1 through 10, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as a transmit point (TP), a TRP, a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication on sidelink, wireless backhaul, moving network, cooperative communication, Coordinated Multi-Point (CoMP) transmissions/receptions such as from multiple TRPs, reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network.

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2:
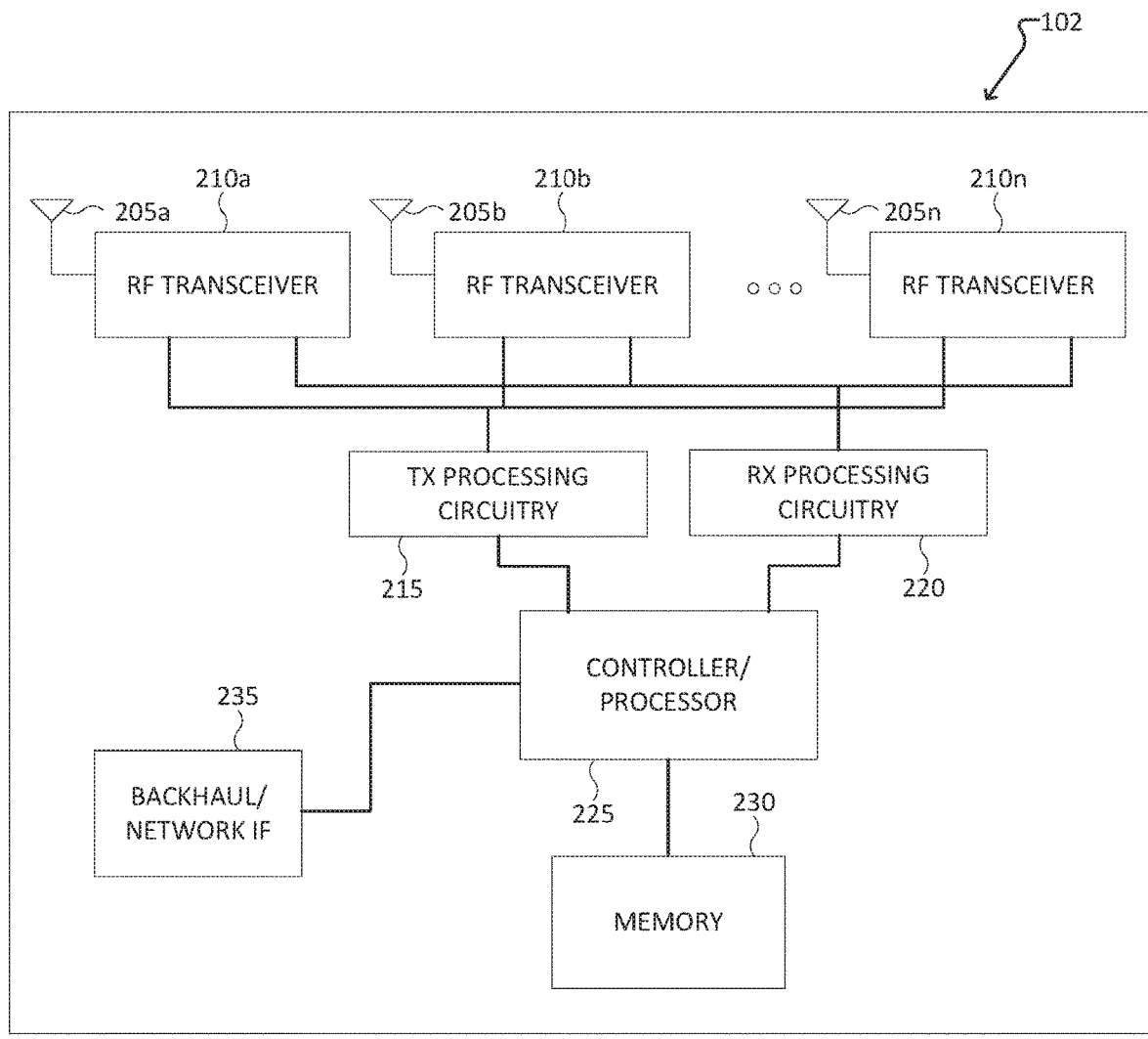
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 transmit downlink control channels for communication with multiple TRPs. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
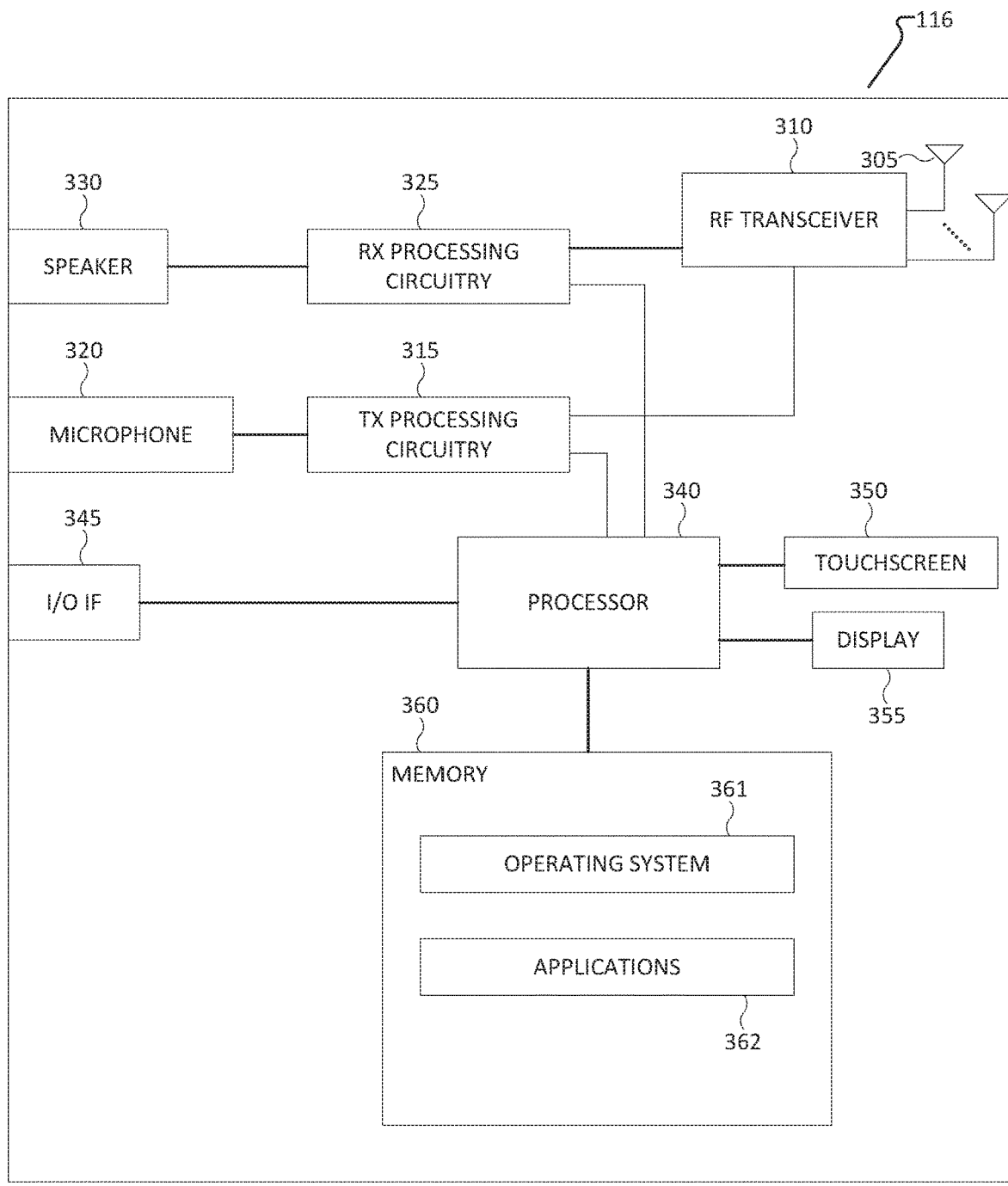
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for monitoring downlink control channels for communication with multiple TRPs. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A time unit for DL signaling or for UL signaling on a cell is one symbol. A symbol belongs to a slot that includes a number of symbols, such as 14 symbols, and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. An RB in one symbol of a slot is referred to as physical RB (PRB) and includes a number of resource elements (REs). For example, a slot can have a duration of 1 millisecond and an RB can have a BW of 180 kHz and include 12 SCs with SC spacing of 15 kHz. As another example, a slot can have a duration of 0.25 milliseconds and an RB can have a BW of 720 kHz and include 12 SCs with SC spacing of 60 kHz.

DL signals include data signals conveying information content, control signals conveying DL control information (DCI), and reference signals (RS) that are also known as pilot signals. A gNB, for example the gNB 102, can transmit data information or DCI through respective physical DL shared channels (PDSCHs) or physical DL control channels (PDCCHs). The gNB can transmit one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources can be used. For interference measurement reports (IMRs), CSI interference measurement (CSI-IM) resources associated with a zero power CSI-RS (ZP CSI-RS) configuration can be used.

A CSI process can include of NZP CSI-RS and CSI-IM resources. A UE, for example the UE 116, can determine CSI-RS transmission parameters through DL control signaling or higher layer signaling, such as radio resource control (RRC) signaling, from a gNB. Transmission instances of a CSI-RS can be indicated by DL control signaling at the physical layer or configured by higher layer signaling. A DMRS is typically received by the UE only in the BW of a respective PDCCH or PDSCH reception and the UE can use the DMRS to demodulate data or control information.

Figure 4A:
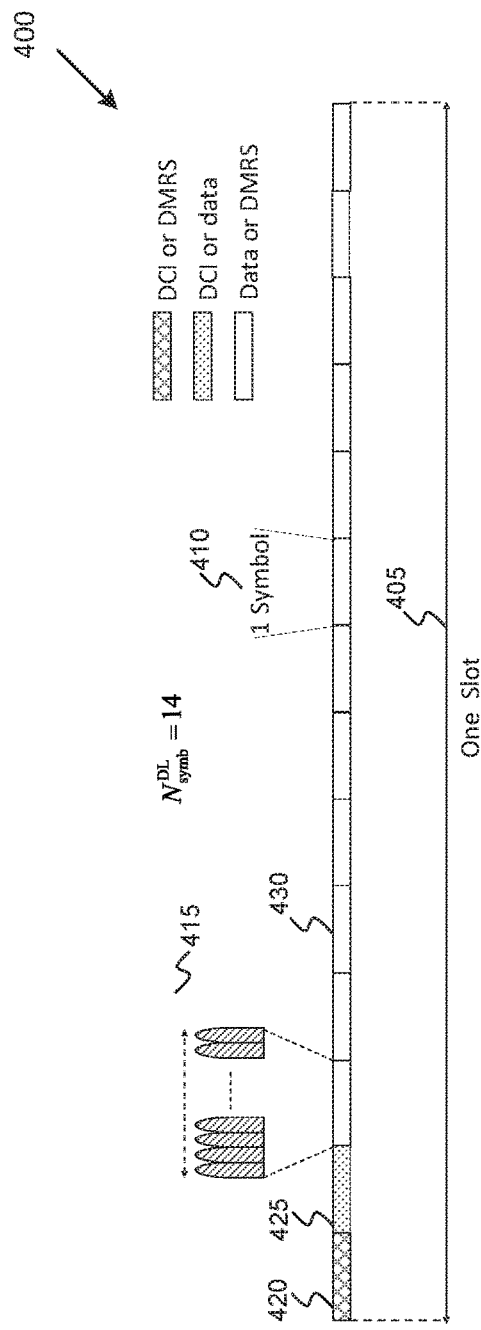
FIG. 4A illustrates an example downlink (DL) slot structure according to various embodiments of the present disclosure.

For example, FIG. 4A illustrates a downlink (DL) slot structure according to various embodiments of the present disclosure. The embodiment of the DL slot structure 400 shown in FIG. 4A is for illustration only and should not be construed as limiting. FIG. 4A does not limit the scope of the present disclosure to any particular DL slot structure.

A DL slot 405 includes $N_{symb}^{DL}$ symbols 410 where a gNB can transmit data information, DCI, or DMRS. A DL system BW includes $N_{RB}^{DL}$ RBs. Each RB includes $N_{sc}^{RB}$ SCs. A UE, such as the UE 116, is assigned $M_{PDSCH}$ RBs for a total of $N_{sc}^{PDSCH} = M_{PDSCH} \cdot N_{sc}^{RB}$ SCs 415 for a PDSCH transmission BW. A PDCCH conveying DCI is transmitted over control channel elements (CCEs) that are substantially spread across the DL system BW. A first slot symbol 420 can be used by the gNB 102 to transmit PDCCH and DMRS associated with PDCCH demodulation. A second slot symbol 425 can be used by the gNB 102 to transmit PDCCH or PDSCH. Remaining slot symbols 430 can be used by the gNB 102 to transmit PDSCH, DMRS associated with each PDSCH, and CSI-RS. In some slots, the gNB 102 can also transmit synchronization signals and channels that convey system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE can transmit data information or UCI through a respective physical UL shared channel (PUSCH) or a physical UL control channel (PUCCH). When a UE simultaneously transmits data information and UCI, the UE can multiplex both in a PUSCH or transmit both a PUCCH with UCI and a PUSCH with data information and possibly some UCI. UCI includes hybrid automatic repeat request acknowledgement (HARQ-ACK) information, indicating correct or incorrect decoding of transport blocks (TBs) or code blocks in a PDSCH, scheduling request (SR) indicating whether a UE has data in its buffer, and CSI reports enabling a gNB to select appropriate parameters for PDSCH or PDCCH transmissions to a UE. For systems operating with hybrid beamforming, UCI can also include beam information such as an index for a set of quasi-collocation parameters, from multiple sets of quasi-collocation parameters, for a received signal and a corresponding reference signal received power (RSRP) value.

A CSI report from a UE can include a channel quality indicator (CQI) informing a gNB of a largest modulation and coding scheme (MCS) for the UE to detect a data TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, and a rank indicator (RI) indicating a transmission rank for a PDSCH.

UL RS includes DMRS and SRS. In some embodiments, DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS reception by the gNB can also provide a PMI for DL transmissions by the gNB. Additionally, in order to establish synchronization or an initial RRC connection with a gNB, a UE can transmit a physical random-access channel (PRACH).

Figure 4B:
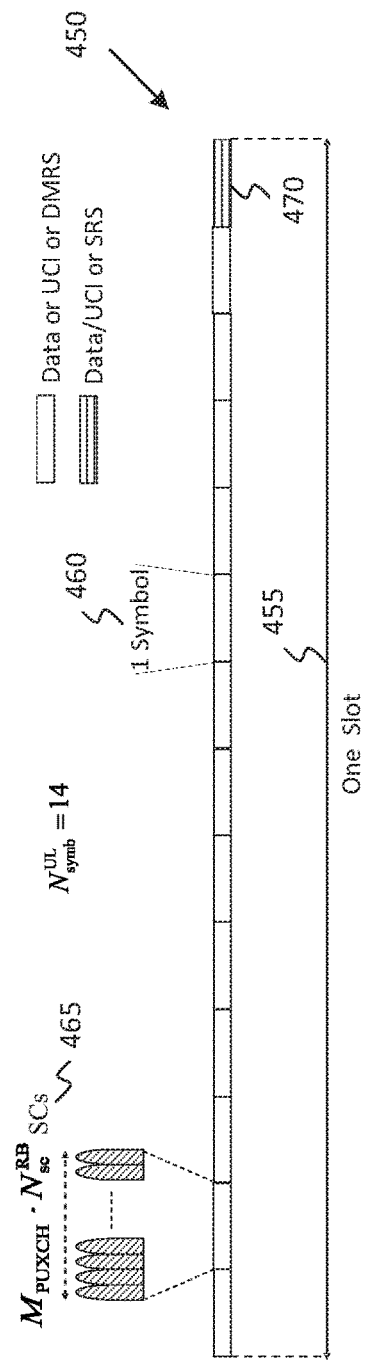
FIG. 4B illustrates an example uplink (UL) slot structure for PUSCH transmission or PUCCH transmission according to various embodiments of the present disclosure.

FIG. 4B illustrates an example slot structure for PUSCH transmission or PUCCH transmission according to various embodiments of the present disclosure. The embodiment of the slot structure 450 shown in FIG. 4B is for illustration only and should not be construed as limiting. FIG. 4B does not limit the scope of the present disclosure to any particular slot structure.

A slot 455 can include $N_{symb}^{UL}$ symbols 460 where a UE, such as the UE 116, transmits a PUSCH or a PUCCH with data information, UCI, or DMRS. An UL system BW includes $N_{RB}^{UL}$ RBs. Each RB includes $N_{sc}^{RB}$ SCs. The UE 116 is assigned $M_{PUXCH}$ RBs for a total of $M_{sc}^{PUXCH} = M_{PUXCH} \cdot N_{sc}^{RB}$ SCs 465 for a PUSCH transmission BW ('X'='S') or for a PUCCH transmission BW ('X'='C'). One or more of last slot symbols can be used to multiplex SRS transmissions 470 from the UE 116. A PUCCH transmission and PUSCH transmission can also occur in a same slot. For example, the UE 116 can transmit PUSCH in the earlier slot symbols and PUCCH in the later slot symbols.

Figure 5A:
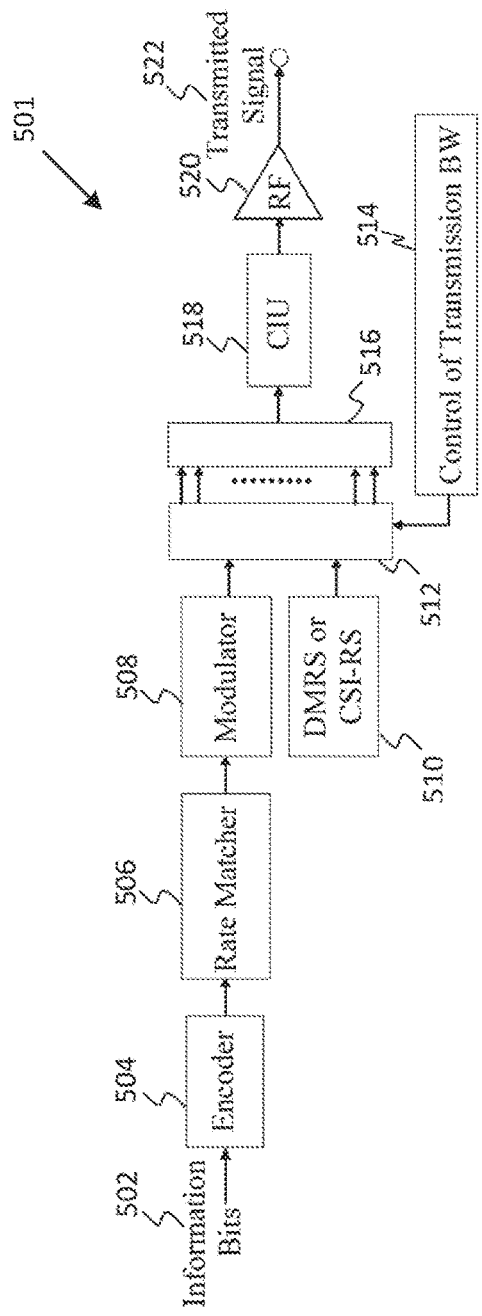
FIG. 5A illustrates an example transmitter structure according to various embodiments of the present disclosure.

A hybrid slot can include a DL transmission region, a guard period region, and an UL transmission region. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions. DL transmissions and UL transmissions can be based on an orthogonal frequency division multiplexing (OFDM) waveform including a variant using DFT preceding that is known as DFT-spread-OFDM FIG. 5A illustrates an example transmitter structure according to various embodiments of the present disclosure. The example transmitter structure 501 illustrated in FIG. 5A is for illustration only and should not be construed as limiting. FIG. 5A does not limit the scope of the present disclosure to any particular transmitter structure. One or more of the components illustrated in FIG. 5A can be implemented in specialized circuitry configured to perform the noted functions or one or more of the components can be implemented by one or more processors executing instructions to perform the noted functions. For example, the transmitter structure 501 can be implemented in a UE 111-116 or a gNB 101-103 that implements the transmit path 200. Other embodiments can be used without departing from the scope of the present disclosure.

Information bits, such as control bits or data bits 502, are encoded by an encoder 504, rate matched to assigned time/frequency resources by a rate matcher 506 and modulated by a modulator 508. Subsequently, modulated encoded symbols and DMRS 510 are mapped to SCs 512 by SC mapping unit 514, an inverse fast Fourier transform (IFFT) is performed by filter 516, a cyclic prefix (CP) is added by CP insertion unit 518, and a resulting signal 522 is filtered by a filter and transmitted by a radio frequency (RF) unit 520.

Figure 5B:
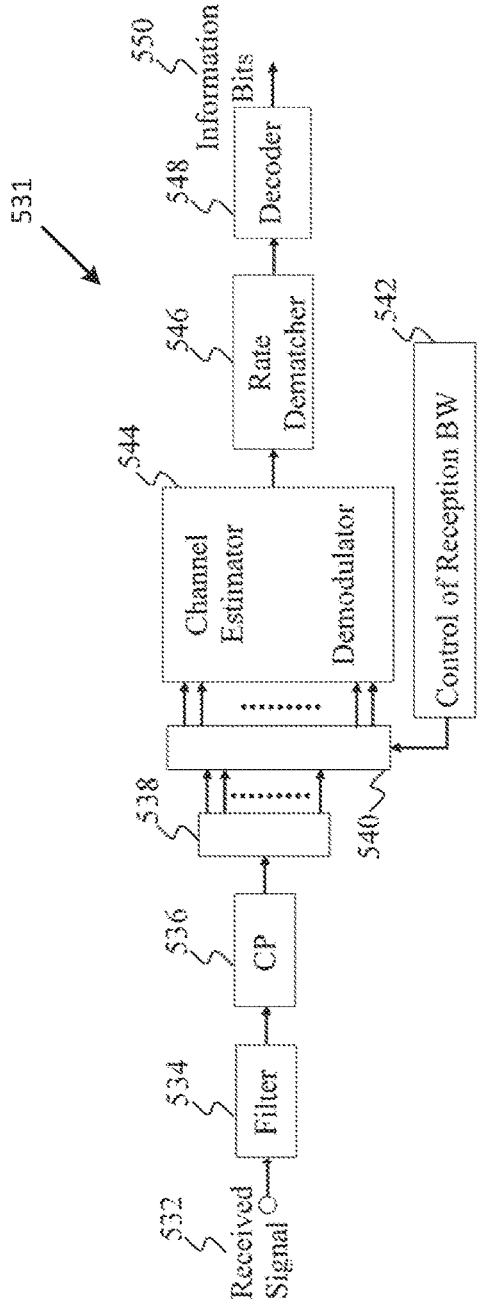
FIG. 5B illustrates an example receiver structure according to various embodiments of the present disclosure.

FIG. 5B illustrates example receiver structure using OFDM according to various embodiments of the present disclosure. The example receiver structure 531 illustrated in FIG. 5B is for illustration only and should not be construed as limiting. FIG. 5B does not limit the scope of the present disclosure to any particular receiver structure. One or more of the components illustrated in FIG. 5B can be implemented in specialized circuitry configured to perform the noted functions or one or more of the components can be implemented by one or more processors executing instructions to perform the noted functions. For example, the receiver structure 531 can be implemented in a UE 111-116 or a gNB 101-103 that implements the receive path 250. Other embodiments can be used without departing from the scope of the present disclosure.

As illustrated in FIG. 5B, a received signal 532 is filtered by filter 534, a CP removal unit 536 removes a CP, a filter 538 applies a fast Fourier transform (FFT), SCs de-mapping unit 540 de-maps SCs selected by BW selector unit 542, received symbols are demodulated by a channel estimator and a demodulator unit 544, a rate de-matcher 546 restores a rate matching, and a decoder 548 decodes the resulting bits to provide information bits 550.

When a UE, such as the UE 116, indicates a carrier aggregation capability larger than 4 serving cells, the UE 116 also indicates a maximum number of PDCCH candidates the UE 116 can monitor per slot when the UE is configured for carrier aggregation operation over more than 4 cells. When the UE 116 is not configured for dual connectivity operation, the UE 116 determines a capability to monitor a maximum number of PDCCH candidates per slot that corresponds to $N_{cells}^{cap}$ downlink cells, where $N_{cells}^{cap}$ is either the number of configured downlink cells or is indicated by the UE 116, for example if the number of configured cell is larger than 4.

For each DL BWP configured to the UE 116 in a serving cell, the UE 116 can be provided by higher layer signaling with P≤3 control resource sets (CORESETs). For each CORESET, the UE 116 is provided a CORESET index p, 0≤p<12, a DM-RS scrambling sequence initialization value, a precoder granularity for a number of resource element groups (REGs) in the frequency domain where the UE 116 can assume use of a same DM-RS precoder, a number of consecutive symbols for the CORESET, a set of resource blocks (RBs) for the CORESET, CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to the UE 116 in a serving cell, the UE 116 can be additionally provided by higher layers with S≤10 search space sets. For each search space set from the S search space sets, the UE 116 is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s<k_s$ slots indicating a number of slots that the search space set s exists, a number of PDCCH candidates $M_s^{(L)}$ per control channel element (CCE) aggregation level L, and an indication that search space set s is either a CSS set or a UE specific search space (USS) set. When search space set s is a CSS set, the UE 116 is provided respective indications for whether or not to monitor PDCCH candidates for DCI format 0_0 and DCI format 1_0, for DCI format 2_0, for DCI format 2_1, for DCI format 2_2, and for DCI format 2_3. The UE 116 can also be provided an indication for whether or not to monitor PDCCH candidates for DCI format 2_4 that indicates to the UE 116 whether or not to monitor PDCCH candidates during a number of next DRX cycles. When search space set s is a USS set, the UE 116 is provided respective indications whether or not to monitor PDCCH candidates either for DCI format 0_0 and DCI format 1_0, or for DCI format 0_1 and DCI format 1_1.

The UE 116 can determine a PDCCH monitoring occasion on an active DL BWP from the PDCCH monitoring periodicity, the PDCCH monitoring offset, and the PDCCH monitoring pattern within a slot. For search space set s, the UE 116 determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \mod k_s = 0$. The UE 116 monitors PDCCH candidates for search space set s for $T_s$ consecutive slots, starting from slot $n_{s,f}^\mu$, and does not monitor PDCCH candidates for search space set s for the next $k_s - T_s$ consecutive slots.

A USS at CCE aggregation level L ∈ {1, 2, 4, 8, 16} is defined by a set of PDCCH candidates for CCE aggregation level L. For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by Equation 1.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad \text{Equation 1}$$

In Equation 1, for any CSS, $Y_{p,n_{s,f}^\mu}=0$. For a USS, $Y_{p,n_{s,f}^\mu} = (A_p \cdot Y_{p,n_{s,f}^\mu - 1}) \mod D$, $Y_{p,-1} = n_{RNTI} \neq 0$, $A_p = 39827$ for p mod 3=0, $A_p = 39829$ for p mod 3=1, $A_p = 39839$ for p mod 3=2, and D=65537. In Equation 1, i=0, . . . , L−1. $N_{CCE,p}$ is the number of CCEs, numbered from 0 to $N_{CCE,p}-1$, in CORESET p. $n_{CI}$ is the carrier indicator field value if the UE is configured with a carrier indicator field for the serving cell on which PDCCH is monitored; otherwise, including for any CSS, $n_{CI}=0$. $m_{s,n_{CI}} = 0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For any CSS, $M_{s,max}^{(L)} = M_{s,0}^{(L)}$. For a USS, $M_{s,max}^{(L)}$ is the maximum of $M_{s,n_{CI}}^{(L)}$ over all configured $n_{CI}$ values for a CCE aggregation level L of search space set s. The RNTI value used for $n_{RNTI}$ is the C-RNTI.

The UE 116 can expect to monitor PDCCH candidates for up to 4 sizes of DCI formats that include up to 3 sizes of DCI formats with CRC scrambled by C-RNTI per serving cell. The UE 116 can count a number of sizes for DCI formats per serving cell based on a number of configured PDCCH candidates in respective search space sets for the corresponding active DL BWP.

In some embodiments, the UE 116 is configured with $N_{cells}^{DL,\mu}$ downlink cells with active DL BWPs having SCS configuration μ where $\Sigma_{\mu=0}^3 N_{cells}^{DL,\mu} \leq N_{cells}^{cap}$. In these embodiments, the UE 116 may not monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

In some embodiments, the UE 116 is configured with $N_{cells}^{DL,\mu}$ downlink cells with active DL BWPs having SCS configuration μ, where $\Sigma_{\mu=0}^3 N_{cells}^{DL,\mu} > N_{cells}^{cap}$, a DL BWP of an activated cell is the active DL BWP of the activated cell, and a DL BWP of a deactivated cell is the DL BWP with index indicated by higher layers for the deactivated cell. In these embodiments, the UE 116 may not monitor more than $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^3 N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^3 N_{cells}^{DL,j} \rfloor$ non-overlapped CCEs per slot on the DL BWP(s) of scheduling cell(s) from the $N_{cells}^{DL,\mu}$ downlink cells.

For each scheduled cell, the UE 116 may not monitor the active DL BWP with SCS configuration μ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot. For SCS configuration μ, a corresponding SCS is $2^\mu \cdot 15$ kHz.

The UE 116 may not be configured with CSS sets that result to corresponding total, or per scheduled cell, numbers of monitored PDCCH candidates and non-overlapped CCEs per slot that exceed the corresponding maximum numbers per slot. For same cell scheduling (self-scheduling) or for cross-carrier scheduling where a scheduling cell has DL BWPs with SCS configuration μ, the UE 116 does not expect a number of PDCCH candidates, and a number of corresponding non-overlapped CCEs per slot on a secondary cell to be larger than the corresponding numbers that the UE 116 is capable of monitoring on the secondary cell per slot. For cross-carrier scheduling, the number of PDCCH candidates for monitoring and the number of non-overlapped CCEs per slot are separately counted for each scheduled cell.

For all search space sets within a slot n, denote by $S_{css}$ a set of CSS sets with cardinality of $I_{css}$ and by $S_{uss}$ a set of USS sets with cardinality of $J_{uss}$. The location of USS sets $s_j$, $0 \leq j < J_{uss}$, in $S_{uss}$ is according to an ascending order of the search space set index. Denote by $M_{S_{css}(i)}^{(L)}$, $0 \le i < I_{css}$, the number of counted PDCCH candidates for monitoring for CSS set $S_{css}(i)$ and by $M_{uss(j)}^{(L)}$, $0 \le j < J_{uss}$, the number of counted PDCCH candidates for monitoring for USS set $S_{uss}(j)$. For the CSS sets, the UE 116 monitors $M_{PDCCH}^{CSS} = \Sigma_{i=0}^{I_{css}-1} \Sigma_L M_{S_{css}(i)}^{(L)}$ PDCCH candidates requiring a total of $C_{PDCCH}^{CSS}$ non-overlapping CCEs in a slot.

The UE 116 allocates PDCCH candidates for monitoring to USS sets for the primary cell having an active DL BWP with SCS configuration µ in slot n according to the following pseudocode. This can be denoted by $V_{CCE}(S_{uss}(j))$ for the set of non-overlapping CCEs for search space set $S_{uss}(j)$ and be denoted by $C(V_{CCE}(S_{uss}(j)))$ for the cardinality of $V_{CCE}(S_{uss}(j))$, where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$. The UE 116 can set $M_{PDCCH}^{uss} = \min(M_{PDCCH}^{max,slot,\mu}, M_{PDCCH}^{total,slot,\mu}) - M_{PDCCH}^{css}$ and set $C_{PDCCH}^{uss} = \min(C_{PDCCH}^{max,slot,\mu}, C_{PDCCH}^{total,slot,\mu}) - C_{PDCCH}^{css}$. While the UE 116 determines $\Sigma_L M_{S_{uss}(j)}^{(L)} \le M_{PDCCH}^{uss}$ AND $C(V_{CCE}(S_{uss}(j))) \le C_{PDCCH}^{uss}$, the UE 116 can allocate $\Sigma_L M_{S_{uss}(j)}^{(L)}$ PDCCH candidates for monitoring to USS set $S_{uss}(j)$ such that $M_{PDCCH}^{uss} = M_{PDCCH}^{uss} - \Sigma_L M_{S_{uss}(j)}^{(L)}$, $C_{PDCCH}^{uss} = C_{PDCCH}^{uss} - C(V_{CCE}(S_{uss}(j)))$, and j=j+1.

In some embodiments, a reception reliability at the UE 116 for a DCI format or for a TB can improve when associated PDCCH or PDSCH transmissions providing the DCI format or the TB occur from multiple transmission points of a serving cell. Similar, a reception reliability at the gNB 102 for UCI or for a TB can improve when an associated PUCCH or PUSCH providing the UCI or the TB are received by multiple reception points of a serving cell. This is particularly the case for cell edge UEs 116. A DL throughput can also increase when multiple transmission points transmit respective multiple TBs to the UE 116. The communication by the UE 116 with multiple TRPs is referred to as multi-TRP communication and can intrinsically provide a boundary-less experience for UEs 116 supporting mobility as associated TRPs can be updated without requiring hard handover.

In various embodiments, multi-TRP communication can provide material benefits to applications requiring enhanced reliability, such as applications associated with ultra-reliable low-latency communications (URLLC), or ones requiring enhanced mobility support such as vehicular communications (V2X). Multi-TRP communication can offer (time/frequency/spatial) diversity to channel or interference conditions for transmission/reception of same control or data information. Multi-TRP communication is typically associated with non-coherent joint transmission (NCJT) as amplitude and phase mismatches are rather difficult to avoid in practice, transceiver RF chains at different TRPs are not typically identical, and coherent combining of corresponding receptions is then disadvantageous. For NCJT, the scheduling and the precoder used at different TRPs can be independent. The UE 116 can provide CSI feedback for each TRP when the UE 116 receives from a single transmission point or transmits to a single reception point.

As described herein, a configuration for communication with multiple TRPs implies configuration of corresponding multiple groups of CORESETs, or of search space sets, for PDCCH monitoring for scheduling PDSCH receptions by or PUSCH transmissions from a UE on a cell. In the following, when referring for brevity to receptions from or transmissions to a TRP, the receptions or the transmissions are scheduled by DCI formats provided by PDCCH receptions in a corresponding group of CORESETs. If receptions or transmissions that are not scheduled by DCI formats, higher layers configuring the receptions or transmissions also configure an association with a CORESET group.

In some embodiments, the UE 116 can receive same or different TBs from multiple TRPs. In these embodiments, the UE 116 typically provides corresponding HARQ-ACK information to the TRPs. When a backhaul link among TRPs does not incur material latency, the UE 116 can provide the HARQ-ACK information in the same HARQ-ACK codeword that the UE 116 multiplexes in the same PUCCH or PUSCH transmission. When the backhaul link among TRPs incurs material latency, the UE 116 can provide the HARQ-ACK information in separate HARQ-ACK codewords. When the UE 116 receives a same TB from multiple TRPs, a size of a corresponding HARQ-ACK codeword can be reduced when the UE 116 does not provide separate HARQ-ACK information for each of the multiple TRPs regardless of a correct or incorrect outcome for the TB reception from a particular TRP. In case of joint HARQ-ACK feedback in a same HARQ-ACK codeword to multiple TRPs, the UE can include a single HARQ-ACK information bit for a same TB transmitted from more than one of the multiple TRPs and the HARQ-ACK information bit has an ACK value if the UE correctly received the TB from at least one TRP; otherwise, the HARQ-ACK information bit has a NACK value. Further, when the UE 116 provides the HARQ-ACK information in a same HARQ-ACK codeword, the UE 116 ensures that both TRPs can reliably detect the HARQ-ACK codeword in a corresponding PUCCH or PUSCH reception.

When scheduling at the multiple TRPs is not tightly coordinated, a first TRP can schedule a PUSCH transmission from the UE 116 prior to a second TRP scheduling a PDSCH reception by the UE 116 where the UE 116 is indicated to multiplex HARQ-ACK information for the PDSCH reception in a PUCCH transmission that overlaps with the PUSCH transmission.

To be configured for multi-TRP communication, such as for NCJT, the UE 116 monitors PDCCH from multiple TRPs. The UE 116 can be configured with one or more CORESETs (a CORESET group) associated with a TRP. For example, a TRP index can be included in a CORESET configuration for an explicit association or the association can be implicit through CORESETs associated with different TRPs having different TCI states. For example, for a UE configured to communicate with two TRPs, CORESETs associated with a first of the two TRPs can have a TRP/group index of 0 while CORESETs associated with a second of the two TRPs can have a TRP/group index of 1. The UE 116 has a predetermined capability for a number of PDCCH candidates to monitor (attempt to decode associated DCI formats) and for a number of non-overlapping CCEs to perform channel estimation over a time span, such as a number of symbols or a slot. Therefore, various embodiments of the present disclosure recognize and consider the need for determining a partitioning of the UE 116 capability for PDCCH monitoring among TRPs and among cells. Various embodiments of the present disclosure further recognize and consider the need for determining an allocation of PDCCH candidates and non-overlapping CCEs to search space sets of TRPs of cells.

The UE 116 further has a predetermined capability per cell for a number of sizes of DCI formats with CRC scrambled by a C-RNTI that the UE 116 can monitor corresponding PDCCH. The use of more than one TRPs per cell can introduce additional sizes for such DCI formats per cell that, without any restrictions or enhancements in the DCI format design, can exceed the UE capability for the number of DCI format sizes. Therefore, various embodiments of the present disclosure recognize and consider the need for DCI formats so that a total number of sizes for DCI formats with CRC scrambled by C-RNTI that the UE monitors PDCCH for scheduling on a cell does not exceed a UE capability for a respective number of sizes. Further various embodiments of the present disclosure recognize and consider the need for a UE 116 to be able to report a capability for a number of sizes of DCI formats with CRC scrambled by a C-RNTI that the UE 116 can monitor PDCCH for scheduling on a cell.

A proper configuration for a set of TRPs, or of PDCCH transmission parameters for a set of TRPs, configured for communication with the UE 116 can change in time due to UE mobility or due to channel or interference variations. As the UE 116 has a limited capability for monitoring PDCCH, the set of TRPs used for communication with the UE 116 can be adapted or parameters used for PDCCH monitoring by the UE 116 can be adapted while minimizing a potential interruption time in the communication with the UE 116. Therefore, various embodiments of the present disclosure recognize and consider the need to minimize a latency in adapting a set of TRPs configured for communication with the UE 116. Further, various embodiments of the present disclosure recognize and consider the need to adapt parameters of search space sets or of associated CORESETs used by the UE 116 to monitor PDCCH from a set of TRPs. Accordingly, various embodiments of the present disclosure enable a UE, such as the UE 116, to monitor PDCCH for communication with multiple TRPs.

For example, various embodiments of the present disclosure enable a mechanism to determine a partitioning of a UE capability for PDCCH monitoring among TRPs of a same scheduling cell and among scheduling cells and determine an allocation of PDCCH candidates and non-overlapping CCEs to search space sets of TRPs of scheduling cells. Embodiments of the present disclosure further provide DCI formats so that a total number of sizes for DCI formats with CRC scrambled by C-RNTI that the UE monitors PDCCH for scheduling on a cell does not exceed a UE capability for a respective number of sizes.

Embodiments of the present disclosure further enable a UE to report a capability for a number of sizes of DCI formats with CRC scrambled by a C-RNTI that the UE can monitor PDCCH for scheduling on a cell. Embodiments of the present disclosure also minimize a latency in adapting a set of TRPs configured for communication with a UE and adapt parameters of search space sets or of associated CORESETs used by the UE 116 to monitor PDCCH from a set of TRPs.

In some embodiments, PDCCH candidates can be allocated to TRPs of a serving cell and a corresponding search space can be determined. A number of CORESETs or a number of search space sets that a UE, such as the UE 116, can be configured with when the UE 116 is configured for communication with multiple TRPs on a cell can be larger than a corresponding number of CORESETs or of search space sets the UE 116 can be configured with when the UE 116 is configured with a single TRP on the cell. For example, when the UE 116 is configured for communication with 2 TRPs on a cell, in addition to the CORESET with index 0, the UE 116 can be configured with up to two CORESETs for a first TRP and with up to two CORESETs for a second TRP, for a total of up to five CORESETs on the cell. When the UE 116 is configured for communication with 1 TRP on a cell, in addition to the CORESET with index 0, the UE 116 can be configured with up to two additional CORESETs.

In one embodiment, where a maximum number of CORESETs for a TRP remains P≤3, the UE 116 can determine a search space for the TRP remains as in Equation 1, where the CORESETs are indexed per TRP and not per cell. For the determination of $Y_{p,n_{s,f}^\mu} = (A_p \cdot Y_{p,n_{s,f}^\mu-1})$ mod D, the CORESET index corresponding to $A_p$ is over only the CORESETs that the UE 116 is configured with for the TRP and not over all CORESETs that the UE 116 is configured with for the cell (that include CORESETs for other TRPs). Therefore, for a determination of a search space for a PDCCH candidate received in a CORESET with index p, $A_p$ can be substituted by $A_{p,t}$ or the index p can be limited to the total number of CORESETs per TRP instead of the total number of CORESETs per cell.

In another embodiment, in order to avoid the UE 116 having the same locations of CCEs for PDCCH candidates in CORESETs with same indexes for different TRPs, and thereby reduce a probability that CCEs for PDCCH candidates of different UEs that overlap in a CORESET for a first TRP also overlap in a CORESET with a same index for a second TRP, a TRP index $n_{TRP}$ is also included in the search space determination. For example, for self-carrier scheduling, the search space can be determined by Equation 2, where $n_{TRP}$ is the TRP index.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{TRP} \right) \mod \lfloor N_{CCE,p}/L \rfloor \right\} + i \quad \text{Equation 2}$$

For example, for a total of $N_{CI}$ scheduled cells from a scheduling cell, the search space can be determined by Equation 3, where $n_{TRP}$ is the TRP index $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} + N_{CI} \cdot n_{TRP} \right) \right. \quad \text{Equation 3}$$

$$\left. \mod \lfloor N_{CCE,p}/L \rfloor \right\} + i$$

or as in Equation 4 where $N_{TRP}$ is a maximum number of TRPs.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \cdot N_{TRP} + n_{TRP} \right) \right. \quad \text{Equation 4}$$

$$\left. \mod \lfloor N_{CCE,p}/L \rfloor \right\} + i$$

Figure 6:
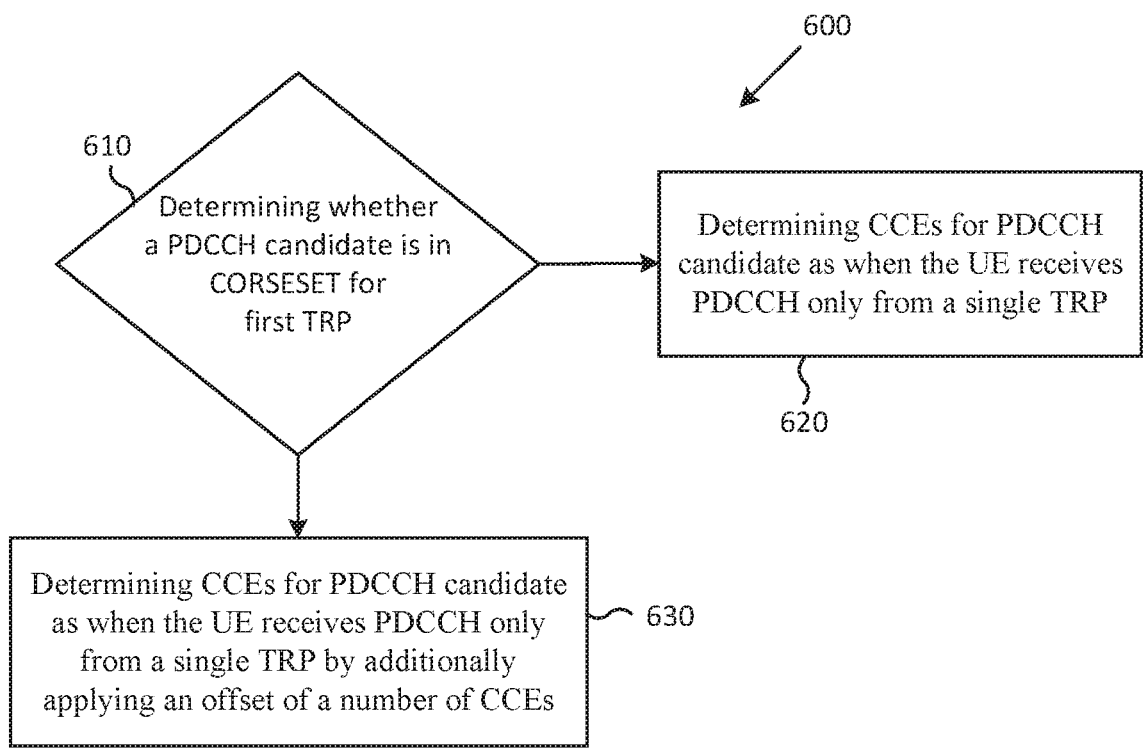
FIG. 6 illustrates a method of determining CCEs for a PDCCH candidate according to various embodiments of the present disclosure.

For example, FIG. 6 illustrates a method of determining CCEs for a PDCCH candidate according to various embodiments of the present disclosure. Although described herein as being implemented by the UE 116, the method 600 illustrated in FIG. 6 can be implemented by one or more of the UEs 111-116 and a corresponding method can be performed by one or more of the gNBs 101-103 described in FIG. 1. Other embodiments can be used without departing from the scope of the present disclosure. In various embodiments, the UE 116 can perform the method 600 to monitor downlink channels for communication with multiple TRPs.

A UE, such as the UE 116, can receive PDCCH from a first TRP and/or from a second TRP. In operation 610, the UE 116 determines whether a CORESET with a corresponding index for a reception of a PDCCH candidate on a scheduling cell is associated with the first TRP or with the second TRP (first CORESET group index or second CORESET group index). In response to determining the CORESET is associated with the first TRP, the UE 116 proceeds to operation 620. In response to determining the CORESET is not associated with the first TRP, the UE 116 proceeds to operation 630.

In operation 620, when the CORESET is associated with a first TRP, the UE 116 determines CCEs for the reception of the PDCCH candidate in the CORESET as for when the UE 116 is configured for PDCCH reception only from a single TRP.

In some embodiments, the UE 116 can determine that when the CORESET is not associated with the first TRP, the CORESET is associated with the second TRP. In operation 630, when the CORESET is associated with a second TRP, the UE 116 determines CCEs for the reception of the PDCCH candidate in the CORESET by additionally applying an offset of a number of CCEs. The scheduling cell does not perform scheduling only on the scheduling cell. For example, when there are more than one scheduled cells from the scheduling cell, the offset of the number of CCEs can depend on a number of scheduled cells from the scheduling cell. In some embodiments, the offset can also depend on a TRP index although this can be transparent for the case of two TRPs.

In embodiments where cross-carrier scheduling is utilized, the UE 116 can be separately configured with search space sets and CORESETs on a scheduling cell for PDSCH receptions from or for PUSCH transmissions to TRPs of a scheduled cell. For example, the UE 116 can be configured with self-carrier scheduling for a first TRP and cross-carrier scheduling for a second TRP. In some embodiments, for the UE 116 to be configured to receive PDSCH from a first TRP and from a second TRP on a first cell operating for example at a millimeter wave (mmWave) band, the UE 116 can receive from the first TRP, on the first cell, a first PDCCH scheduling the first PDSCH reception and receive, from a second cell, a second PDCCH scheduling the second PDSCH reception. For example, the second cell can operate at a lower carrier frequency than the first cell. In some embodiments, the second cell can operate at 3.5 GHz. Accordingly, the first TRP can be used to schedule the UE 116 while providing robustness to PDSCH receptions in case of a link deterioration on the first cell operating at a mmWave band that is more likely that a link deterioration on the second cell operating at 3.5 GHz.

Figure 7:
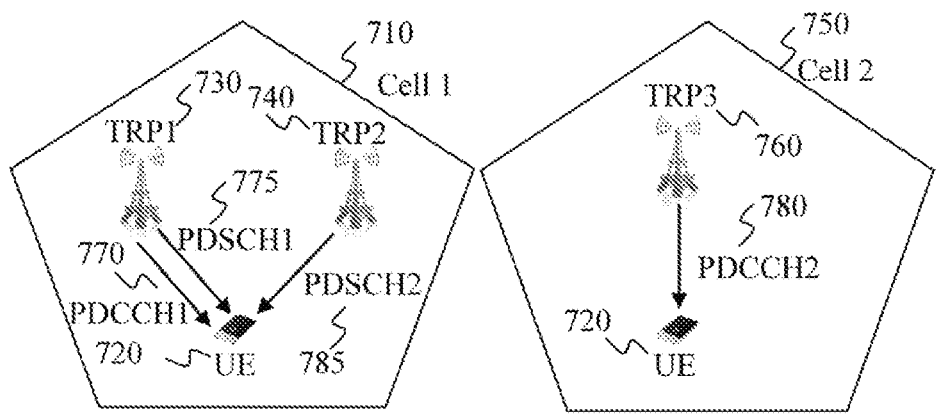
FIG. 7 illustrates scheduling of a first PDSCH reception and a second PDSCH reception according to various embodiments of the present disclosure.

For example, FIG. 7 illustrates scheduling of a first PDSCH reception and a second PDSCH reception according to various embodiments of the present disclosure. In particular, FIG. 7 illustrates an example scheduling of a first PDSCH reception from a first TRP on a first cell by a first PDCCH reception from the first TRP on the first cell and of a second PDSCH reception from a second TRP on the first cell by a second PDCCH reception on a second cell.

FIG. 7 illustrates a first cell, Cell 1 710, operating on a first frequency layer and a second cell, Cell 2 750, operating on a second frequency layer. On the first cell 710, a UE 720 is configured for receptions from a first TRP, TRP1 30, and a second TRP, TRP2 740. The UE 720 can be any one of the UEs 111-116. Also, on the first cell 710, the UE 720 receives, from the first TRP 730, a first PDCCH, PDCCH 1 770, and a first PDSCH, PDSCH 1 775, that is scheduled by a DCI format that is provided by the first PDCCH 770. The UE 720 also receives, from the second TRP 740, a second PDSCH, PDSCH 2 785.

On the second cell 750, the UE 720 is configured for receptions from a third TRP, TRP 760. The UE 720 receives, from the third TRP 760, a second PDCCH, PDCCH 2 780, that provides a DCI format scheduling the second PDSCH 785.

Embodiments of the present disclosure consider various approaches for partitioning PDCCH candidates and non-overlapping CCEs among cells and TRPs. In one embodiment, the partitioning per cell of the capability of the UE 116 to monitor PDCCH candidates and to perform channel estimation over a number of non-overlapping CCEs is the same as for embodiments of a single TRP per cell. After determining a number of PDCCH candidates and a number of non-overlapping CCEs for a serving cell where the UE 116 is configured to monitor PDCCH over more than one TRPs, the UE 116 can determine an allocation for a number of PDCCH candidates or a number of non-overlapping CCEs to search space sets of TRPs for scheduling on the serving cell. Therefore, for the UE 116 configured with $N_{cells}^{DL,\mu}$ downlink cells with DL BWPs having SCS configuration $\mu$, the UE 116 may not monitor more than $M_{PDCCH}^{total,slot,\mu} = \lfloor N_{cells}^{cap}, M_{PDCCH}^{max,slot,\mu} \cdot N_{cells}^{DL,\mu} / \Sigma_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ non-overlapped CCEs per slot on the one or more DL BWPs of one or more scheduling cells from the $N_{cells}^{DL,\mu}$ downlink cells. In various embodiments, the DL BWPs can be active for activated cells or inactive/dormant for deactivated cells. The UE 116 can monitor PDCCH candidates or non-overlapped CCEs per slot accordingly regardless of a number of TRPs the UE 116 is configured per cell from the $N_{cells}^{DL,\mu}$ downlink cells or across all $N_{cells}^{DL,\mu}$ downlink cells and despite an increase in a maximum number of CORESETs that the UE can be configured on a scheduling cell where the UE monitors PDCCH over more than one TRPs for scheduling on the serving cell.

In some embodiments, to realize the determination of CSS sets for TRPs, the UE 116 can expect that there is a sufficient number of PDCCH candidates and non-overlapping CCEs on the primary cell for allocation to all CSS sets of all TRPs (and any dropped search space set is a USS set).

In other embodiments, to realize the determination of CSS sets for TRPs, such as when more than one TRP for the UE 116 has a configuration for one or more CSS sets, a gNB, such as the gNB 102, can be enabled to have full flexibility in the configuration of CSS sets, such as in the configuration of a number of PDCCH candidates per CCE aggregation level or of PDCCH monitoring occasions for a CSS set. For example, a total number of PDCCH candidates or a total number of non-overlapped CCEs per slot for all CSS sets of all TRPs can exceed corresponding maximum numbers per slot for a serving cell such as the primary cell (PCell). The UE 116 can allocate PDCCH candidates and non-overlapping CCEs to CSS sets of TRPs either first in an ascending order of CSS set indexes, starting from the CSS set with the smallest index of the TRP with the smallest index, and then in an ascending order of TRP indexes, or first in an ascending order of TRP indexes, starting from the CSS set with the smallest index of the TRP with the smallest index, and then in an ascending order of TRP indexes.

When the UE 116 allocates PDCCH candidates and non-overlapping CCEs to CSS sets of TRPs first in an ascending order of CSS set indexes and then in an ascending order of TRP indexes, the UE 116 can determine the CSS sets for a cell (such as a primary cell) having an active DL BWP with SCS configuration p. in slot n according to a pseudocode, or any other equivalent procedure for resulting CSS sets where the UE monitors PDCCH, where:

T the number of TRPs configured for a UE on the primary cell

J(t) the total number of CSS sets for TRP t $V_{CCE}(S_{css}(j, t))$ the set of non-overlapping CCEs for search space set $S_{css}(j, t)$ of TRP t, $0 \le t < T$, $C(V_{CCE}(S_{css}(j, t)))$ the cardinality of $V_{CCE}(S_{css}(j, t))$ where the non-overlapping CCEs for search space set $S_{css}(j, t)$ are determined considering the allocated PDCCH candidates for monitoring for the CSS sets and the allocated PDCCH candidates for monitoring for all search space sets $S_{css}(k, t)$, $0 \le k \le j$.

---

Set $M_{PDCCH}^{css} = \min(M_{PDCCH}^{max,slot,\mu}, M_{PDCCH}^{total,slot,\mu})$
Set $C_{PDCCH}^{css} = \min(C_{PDCCH}^{max,slot,\mu}, C_{PDCCH}^{total,slot,\mu})$
Set t = 0
Set j = 0
while t < T
  while j < J(t)
    if $\Sigma_L M_{(S_{css}(j,t))}^{(L)} \le M_{PDCCH}^{css}$ AND $C(V_{CCE}(S_{css}(j, t))) \le C_{PDCCH}^{css}$
      allocate $\Sigma_L M_{S_{css}(j,t)}^{(L)}$ PDCCH candidates for monitoring to CSS set $S_{css}(j, t)$
      $M_{PDCCH}^{css} = M_{PDCCH}^{css} - \Sigma_L M_{S_{css}(j,t)}^{(L)}$;
      $C_{PDCCH}^{css} = C_{PDCCH}^{css} - C(V_{CCE}(S_{uss}(j, t)))$;
      j = j + 1;
    else
      break;
    end if
  end while
t = t + 1;
end while

---

For example, when the UE 116 is configured with two TRPs, the UE 116 can assume that all PDCCH candidates for all CSS sets are allocated for the first TRP on the primary cell (and any dropped search space set is a USS set for the first TRP of the primary cell). A corresponding number of PDCCH candidates is $M_{PDCCH}^{css,TRP1}$ and a corresponding number of non-overlapping CCEs is $C_{PDCCH}^{css,TRP1}$. The UE 116 determines an allocation of PDCCH candidates to CSS sets according to the following pseudocode. If the UE 116 does not monitor PDCCH candidates for a CSS set with index j for TRP t in the slot, $\Sigma_L M_{(S_{css}(j,t))}^{(L)}=0$, and $C(V_{CCE}(S_{css}(j, t)))=0$, or equivalently, the UE 116 skips allocation of PDCCH candidates and of non-overlapping CCEs for CSS set with index j for TRP t in the slot, then:

---

Set $M_{PDCCH}^{css} = \min(M_{PDCCH}^{max,slot,\mu}, M_{PDCCH}^{total,slot,\mu}) - M_{PDCCH}^{css,TRP1}$
Set $C_{PDCCH}^{css} = \min(C_{PDCCH}^{max,slot,\mu}, C_{PDCCH}^{total,slot,\mu}) - C_{PDCCH}^{css,TRP1}$
Set j = 0
while j < J(t)
  if $\Sigma_L M_{(S_{css}(j,t))}^{(L)} \le M_{PDCCH}^{css}$ AND $C(V_{CCE}(S_{css}(j, t))) \le C_{PDCCH}^{css}$
    allocate $\Sigma_L M_{S_{css}(j,t)}^{(L)}$ PDCCH candidates for monitoring to CSS set $S_{css}(j, t)$
    $M_{PDCCH}^{css} = M_{PDCCH}^{css} - \Sigma_L M_{S_{css}(j,t)}^{(L)}$;
    $C_{PDCCH}^{css} = C_{PDCCH}^{css} - C(V_{CCE}(S_{uss}(j, t)))$;
    j = j + 1;
  else
    break;
  end if
end while

---

As described herein, starting the allocation of PDCCH candidates and non-overlapping CCEs from the first TRP for all CSS sets, instead of by alternating across TRPs for a CSS set before possibly continuing for a next CSS set, can allow maximum allocation of CSS sets and minimize a probability that the UE 116 needs to drop a CSS set. For example, the UE 116 may not expect to drop any CSS set for a first TRP.

Figure 8:
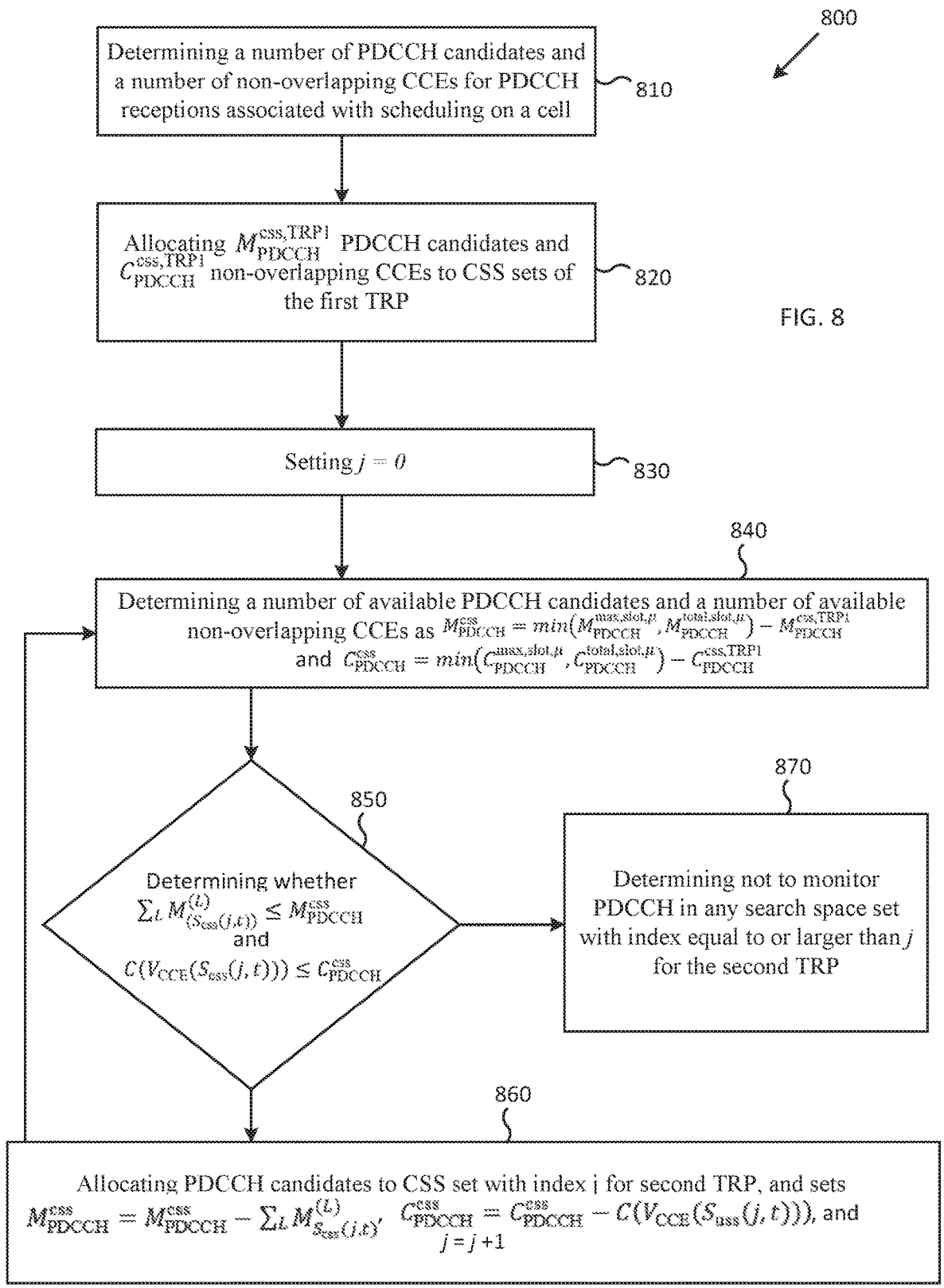
FIG. 8 illustrates a method of determining CSS sets to monitor two TRPs of a cell according to various embodiments of the present disclosure.

For example, FIG. 8 illustrates a method of determining CSS sets to monitor two TRPs of a cell according to various embodiments of the present disclosure. Although described herein as being implemented by the UE 116, the method 800 illustrated in FIG. 8 can be implemented by one or more of the UEs 111-116 and a corresponding method can be performed by one or more of the gNBs 101-103 described in FIG. 1. Other embodiments can be used without departing from the scope of the present disclosure. In various embodiments, the UE 116 can perform the method 800 to monitor downlink channels for communication with multiple TRPs.

In operation 810, a UE, such as the UE 116, determines a number of PDCCH candidates and/or a number of non-overlapping CCEs for PDCCH receptions in a slot that is associated with scheduling on a cell. In some embodiments, the determination by the UE 116 also includes PDCCH receptions providing DCI formats that do not schedule PDSCH receptions or PUSCH transmissions.

In operation 820, the UE 116 allocates $M_{PDCCH}^{css,TRP1}$ PDCCH candidates and $C_{PDCCH}^{css,TRP1}$ non-overlapping CCEs to CSS sets of a first TRP. In operation 830, the UE 116 sets j=0.

In operation 840, the UE 116 determines a number of available PDCCH candidates and a number of available non-overlapping CCEs. As the UE 116 determines the available PDCCH candidates and available non-overlapping CCEs, $M_{PDCCH}^{css}=\min(M_{PDCCH}^{max,slot,\mu}, M_{PDCCH}^{total,slot,\mu})-M_{PDCCH}^{css,TRP1}$ and $C_{PDCCH}^{css}=\min(C_{PDCCH}^{max,slot,\mu}, C_{PDCCH}^{total,slot,\mu})-C_{PDCCH}^{css,TRP1}$, respectively.

In operation 850, the UE 116 determines, for the CSS set with index j for a second TRP, whether a number of PDCCH candidates $\Sigma_L M_{(S_{css}(j,t))}^{(L)}$ is smaller than or equal to $M_{PDCCH}^{css}=\min(M_{PDCCH}^{max,slot,\mu}, M_{PDCCH}^{total,slot,\mu})-M_{PDCCH}^{css, TRP1}$ and a whether number of non-overlapping CCEs $C(V_{CCE}(S_{css}(j, t)))$ is smaller than or equal to $C_{PDCCH}^{css}$. In response to the UE 116 determining that both the number of PDCCH candidates $\Sigma_L M_{(S_{css}(j,t))}^{(L)}$ is smaller than or equal to $M_{PDCCH}^{css}=\min(M_{PDCCH}^{max,slot,\mu}, M_{PDCCH}^{total,slot,\mu})=M_{PDCCH}^{css,TRP1}$ and number of non-overlapping CCEs $C(V_{CCE}(S_{css}(j, t)))$ is smaller than or equal to $C_{PDCCH}^{css}$, the UE 116 proceeds to operation 860. In response to determining that either the number of PDCCH candidates $\Sigma_L M_{(S_{css}(j,t))}^{(L)}$ is not smaller than or equal to $M_{PDCCH}^{css}=\min(M_{PDCCH}^{max,slot,\mu}, M_{PDCCH}^{total,slot,\mu})-M_{PDCCH}^{css,TRP1}$ or number of non-overlapping CCEs C $(V_{CCE}(S_{css}(j, t)))$ is not smaller than or equal to $C_{PDCCH}^{css}$, the UE 116 proceeds to operation 870. In operation 870, the method 800 terminates. More specifically, the UE 116 determines not to monitor the PDCCH in any search space set with an index equal to or larger than j for the second TRP.

In operation 860, based on the UE 116 determining that both the number of PDCCH candidates $\Sigma_L M_{(S_{css}(j,t))}^{(L)}$ is smaller than or equal to $M_{PDCCH}^{css}=\min(M_{PDCCH}^{max,slot,\mu}, M_{PDCCH}^{total,slot,\mu})-M_{PDCCH}^{css,TRP1}$ and number of non-overlapping CCEs $C(V_{CCE}(S_{css}(j, t)))$ is smaller than or equal to $C_{PDCCH}^{css}$, the UE 116 allocates PDCCH candidates to CSS set with index j for the second TRP, sets $M_{PDCCH}^{css}=M_{PDCCH}^{css}-\Sigma_L M_{S_{css}(j,t)}^{(L)}$, $C_{PDCCH}^{css}=C_{PDCCH}^{css}-C(V_{CCE}(S_{uss}(j,t)))$, and j=j+1.

After the UE 116 allocates the PDCCH candidates to CSS set with index j for the second TRP, sets $M_{PDCCH}^{css}=M_{PDCCH}^{css}-\Sigma_L M_{S_{css}(j,t)}^{(L)}$, $C_{PDCCH}^{css}=C_{PDCCH}^{css}-C(V_{CCE}(S_{uss}(j,t)))$, and j=j+1 in operation 860, the UE 116 returns to operation 840 and determines the available PDCCH candidates and available non-overlapping CCEs as $M_{PDCCH}^{css}=\min(M_{PDCCH}^{max,slot,\mu}, M_{PDCCH}^{total,slot,\mu})-M_{PDCCH}^{css,TRP1}$ and $C_{PDCCH}^{css}=\min(C_{PDCCH}^{max,slot,\mu}, C_{PDCCH}^{total,slot,\mu})-C_{PDCCH}^{css,TRP1}$, respectively.

Although described herein as a series of steps, the steps of the method 800 can occur simultaneously or in a different order. For example, the UE 116 can set j=0 in operation 830 before or concurrently with allocating $M_{PDCCH}^{css,TRP1}$ PDCCH candidates and $C_{PDCCH}^{css,TRP1}$ non-overlapping CCEs to CSS sets of a first TRP in operation 820.

In operation 820, the UE 116 allocates $M_{PDCCH}^{css,TRP1}$ PDCCH candidates and $C_{PDCCH}^{css,TRP1}$ non-overlapping CCEs to CSS sets of a first TRP. In operation 830, the UE 116 sets j=0

As the UE 116 allocates PDCCH candidates and non-overlapping CCEs to CSS sets of TRPs first in an ascending order of TRP indexes and then in an ascending order of CSS set indexes, a corresponding pseudocode is generated for when the allocation of PDCCH candidates and non-overlapping CCEs is first in an ascending order of CSS set indexes and then in an ascending order of TRP indexes. An exception can be the order of the 'while' loops for the indexes of the CSS sets and the indexes of the TRPs is reversed. Whether the allocation of PDCCH candidates and non-overlapping CCEs is first in an ascending order of CSS set indexes (starting from the CSS set with the smallest index of the TRP with the smallest index) and then in an ascending order of TRP indexes, or is first in an ascending order of TRP indexes (starting from the CSS set with the smallest index of the TRP with the smallest index) and then in an ascending order of CSS set indexes, can be configured to the UE 116 by a gNB, such as the gNB 102, through higher layer signaling.

For the USS sets on the primary cell, various embodiments of the allocation are possible. For example, the allocation can be first across TRP indexes and then across USS set indexes (for example, starting from the USS set with the smallest index of the TRP with the smallest index), or first across USS set indexes and then across TRP indexes (starting from the USS set with the smallest index of the TRP with the smallest index). In various embodiments, the prioritization order can be specified in the system operation or can be configured to the UE 116 by the gNB 102 through higher layer signaling. A corresponding pseudocode, as described herein, can be as previously described with the exception that, for a serving cell where the UE 116 monitors PDCCH in CSS sets, $M_{PDCCH}^{css}=\min(M_{PDCCH}^{max,slot,\mu}, M_{PDCCH}^{total,slot,\mu})$ can be replaced by $M_{PDCCH}^{uss}=\min(M_{PDCCH}^{max,slot,\mu}, M_{PDCCH}^{total,slot,\mu})-M_{PDCCH}^{css}$ and $C_{PDCCH}^{css}=\min(C_{PDCCH}^{max,slot,\mu}, C_{PDCCH}^{total,slot,\mu})$ can be replaced by $C_{PDCCH}^{uss}=\min(C_{PDCCH}^{max,slot,\mu}, C_{PDCCH}^{total,slot,\mu})-C_{PDCCH}^{css}$ where $M_{PDCCH}^{css}$ and $C_{PDCCH}^{css}$ are the number of PDCCH candidates and the number of non-overlapping CCEs, respectively, allocated for PDCCH monitoring to the CSS sets of the TRPs on the serving cell.

In some embodiments, in addition to the primary cell, the UE 116 may not have available PDCCH candidates or non-overlapping CCEs to allocate to all USS sets on a secondary cell where the UE 116 is configured to communicate with multiple TRPs. In these embodiments, the UE 116 can apply a same procedure, as for the primary cell, for allocation of available PDCCH candidates or non-overlapping CCEs to USS sets in the secondary cell.

As described herein, various embodiments of the present disclosure consider various approaches for partitioning PDCCH candidates and non-overlapping CCEs among cells and TRPs. As discussed previously, in one embodiment, the partitioning per cell of the capability of a UE to monitor PDCCH candidates and to perform channel estimation over a number of non-overlapping CCEs is the same as for embodiments of a single TRP per cell. In another embodiment, for the purpose of partitioning the UE capability for monitoring a number of PDCCH candidates and for performing channel estimation over a number of non-overlapping CCEs, each TRP is treated as a cell. When a UE can support communication with multiple TRPs on a serving cell, for example as part of a report of UE capabilities, a UE capability to monitor PDCCH over a number of $N_{cells}^{cap}$ cells becomes equivalent to a UE capability to monitor PDCCH over a number of $N_{TRPs}^{cap}$ TRPs. For a UE configured with a total number of $N_{TRPs}^{DL,\mu}$ TRPs with active DL BWPs having SCS configuration $\mu$, the UE may not monitor more than $M_{PDCCH}^{total,slot,\mu}=\lfloor N_{cells}^{cap} \cdot M_{PDCCH}^{max,slot,\mu} \cdot N_{cells}^{DL,\mu}/\Sigma_{j=0}^{3}(N_{cells,0}^{DL,j}+N_{cells,1}^{DL,j})\rfloor=\lfloor N_{cells}^{cap} \cdot M_{PDCCH}^{max,slot,\mu} \cdot N_{TRPs}^{DL,\mu}/\Sigma_{j=0}^{3} N_{TRPs}^{DL,j}\rfloor$ PDCCH candidates or more than $C_{PDCCH}^{total,slot,\mu}=\lfloor N_{cells}^{cap} \cdot C_{PDCCH}^{max,slot,\mu} \cdot N_{cells}^{DL,\mu}/\Sigma_{j=0}^{3}(N_{cells,0}^{DL,j}+N_{cells,1}^{DL,j})\rfloor=\lfloor N_{cells}^{cap} \cdot C_{PDCCH}^{max,slot,\mu} \cdot N_{TRPs}^{DL,\mu}/\Sigma_{j=0}^{3} N_{TRPs}^{DL,j}\rfloor$ non-overlapped CCEs per slot on the DL BWP(s) of scheduling TRP(s) from the $N_{TRPs}^{DL,j}$ TRPs, where $N_{cells,0}^{DL,j}$ is the number of cells with active DL BWPs having SCS configuration j where the UE monitor PDCCH from a single TRP (all CORESETs have same index) and $N_{cells,1}^{DL,j}$ is the number of cells with active DL BWPs having SCS configuration j where the UE monitor PDCCH from two TRPs (there are CORESETs with different indexes). It is $N_{cells,0}^{DL,j}=N_{cells}^{DL,j}-N_{cells,1}^{DL,j}$. In various embodiments, the DL BWPs can be active for activated cells or inactive for deactivated cells.

In various embodiments, the UE 116 can report a first capability for PDCCH monitoring for a number of cells, $N_{cells}^{cap}$, that is applicable when the UE 116 is not configured for multi-TRP communication on any cell, and report a second capability for PDCCH monitoring for a number of TRPs, $N_{TRPs}^{cap}$, that is applicable when the UE 116 is configured for multi-TRP communication on at least one cell. Equivalently, a same UE capability for PDCCH monitoring for a number of cells, $N_{cells}^{cap}$, is applicable regardless of whether or not the UE 116 is configured for communication with one TRP on each configured cell or with more than one TRP on some configured cells and UE 116 can report another capability for PDCCH monitoring on cells configured with multiple TRPs where, according to the previous two embodiments, the two TRPs are treated either as a single cell (UE capability for PDCCH monitoring per cell is not increased—lower bound) or as two separate cells (UE capability for PDCCH monitoring per cell is doubled—upper bound). For example, a UE that does not support multi-TRP operation can indicate $N_{cells}^{cap}=4$, while a UE that supports multi-TRP operation can indicate $N_{TRPs}^{cap}=8$ or can indicate $N_{cells}^{cap}=4$ and indicate a separate capability for an increased PDCCH monitoring capability per cell by a factor of 2. Further, a UE that supports multi-TRP operation can use an increased PDCCH monitoring capability per cell also when the UE is not configured for multi-TRP operation. In the previous example, the UE can support $N_{cells}^{cap}=8$ when the UE is not configured for multi-TRP operation in any cell.

For example, for a maximum of two TRPs per cell, when the UE 116 is configured with $\Sigma_{j=0}^{3} N_{cells}^{DL,j} \leq 4$ cells with one TRP per cell, the UE 116 supports $M_{PDCCH}^{max,slot,\mu}$ and $C_{PDCCH}^{max,slot,\mu}$ per cell per slot for SCS configuration $\mu$. When the UE 116 is configured with $\sigma_{j=0}^{3} N_{cells}^{DL,j}>4$ cells with one TRP per cell, the UE 116 supports $M_{PDCCH}^{total,slot,\mu} = \lfloor N_{cells}^{cap} \cdot M_{PDCCH}^{max,slot,\mu} \cdot N_{cells}^{DL,\mu} / \sum_{j=0}^{3} N_{cells}^{DL,j} \rfloor$ and $C_{PDCCH}^{total,slot,\mu} = \lfloor N_{cells}^{cap} \cdot C_{PDCCH}^{max,slot,\mu} \cdot N_{cells}^{DL,\mu} / \sum_{j=0}^{3} N_{cells}^{DL,j} \rfloor$ per cell per slot for SCS configuration $\mu$. When the UE 116 is configured with $\sum_{j=0}^{3} \sum_{c=0}^{N_{cells}^{DL,j}-1} N_{TRP}^{c,j} = \sum_{j=0}^{3} (N_{cells,0}^{DL,j} + 2 \cdot N_{cells}^{DL,j}) \le 4$ TRPs, where $N_{TRP}^{c,j}$ is a number of TRPs for cell c with SCS configuration $\mu$, the UE 116 supports $M_{PDCCH}^{max,slot,\mu}$ and $C_{PDCCH}^{max,slot,\mu}$ per TRP per slot for SCS configuration $\mu$. When the UE 116 is configured with $\sum_{j=0}^{3} \sum_{c=0}^{N_{cells}^{DL,j}-1} N_{TRP}^{c,j} = \sum_{j=0}^{3} (N_{cells,0}^{DL,j} + 2 \cdot N_{cells,1}^{DL,j}) > 4$ TRPs, the UE 116 supports $M_{PDCCH}^{total,slot,\mu} = \lfloor N_{cells_{DL,j}}^{cap} \cdot M_{PDCCH}^{max,slot,\mu} \cdot N_{cells}^{DL,\mu} / \sum_{j=0}^{3} \sum_{c=0}^{N_{cells}^{DL,j}-1} N_{TRP}^{c,j} \rfloor = \lfloor N_{cells}^{cap} \cdot M_{PDCCH}^{max,slot,\mu} \cdot N_{cells}^{DL,\mu} / \sum_{j=0}^{3} (N_{cells,0}^{DL,j} + 2 \cdot N_{cells,1}^{DL,j}) \rfloor$ and $C_{PDCCH_{DL,j}}^{total,slot,\mu} = \lfloor N_{cells}^{cap} \cdot C_{PDCCH}^{max,slot,\mu} \cdot N_{cells}^{DL,\mu} / \sum_{j=0}^{3} \sum_{c=0}^{N_{cells}^{DL,j}-1} N_{TRP}^{c,j} \rfloor = \lfloor N_{cells}^{cap} \cdot C_{PDCCH}^{max,slot,\mu} \cdot N_{cells}^{DL,\mu} / \sum_{j=0}^{3} (N_{cells,0}^{DL,j} + 2 \cdot N_{cells,1}^{DL,j}) \rfloor$ per TRP per slot for SCS configuration $\mu$.

In various embodiments, the UE 116 supports PDCCH monitoring for a first maximum number of PDCCH candidates $M_{PDCCH}^{total,max,\mu}$ and a first maximum non-overlapping CCEs $C_{PDCCH}^{total,max,\mu}$ per slot or per PDCCH monitoring span for SCS configuration $\mu$ when the UE 116 is configured for communication with a single TRP on a cell. The UE further supports PDCCH monitoring for a second maximum number of PDCCH candidates $M_{PDCCH,TRP}^{total,max,\mu} \ge M_{PDCCH}^{total,max,\mu}$ and a second maximum non-overlapping CCEs $C_{PDCCH,TRP}^{total,max,\mu} > C_{PDCCH}^{total,max,\mu}$ per slot or per PDCCH monitoring span for SCS configuration $\mu$ when the UE 116 is configured for communication with more than one TRPs.

For an allocation, by the UE, of PDCCH candidates and non-overlapping CCEs to CSS sets and USS sets when the UE is configured communication with multiple TRPs in at least one cell, the same procedure can be applied as for the allocation of PDCCH candidates and non-overlapping CCEs to CSS sets and USS sets when the UE is configured communication with a single TRP in all cells. For example, for any TRP of the primary cell or for the first TRP of the primary cell, the following procedure can apply:

Begin Procedure

For all search space sets within a slot n, denote by $S_{css}$ a set of CSS sets with cardinality of $I_{css}$ and by $S_{uss}$ a set of USS sets with cardinality of $J_{uss}$. The location of USS sets $s_j$, $0 \le j < J_{uss}$, in $S_{uss}$ is according to an ascending order of the search space set index. Denote by $M_{S_{css}(i)}^{(L)}$, $0 \le i < I_{css}$, the number of counted PDCCH candidates for monitoring for CSS set $S_{css}(i)$ and by $M_{S_{uss}(j)}^{(L)}$, $0 \le j < J_{uss}$, the number of counted PDCCH candidates for monitoring for USS set $S_{uss}(j)$.

For the CSS sets, a UE monitors $M_{PDCCH}^{CSS} = \sum_{i=0}^{I_{css}-1} \sum_L M_{S_{css}(i)}^{(L)}$ PDCCH candidates requiring a total of $C_{PDCCH}^{CSS}$ non-overlapping CCEs in a slot.

The UE allocates PDCCH candidates for monitoring to USS sets for the first TRP of the primary cell having an active DL BWP with SCS configuration $\mu$ in slot n according to the following pseudocode.

Denote by $V_{CCE}(S_{uss}(j))$ the set of non-overlapping CCEs for search space set $S_{uss}(j)$ and by $C(V_{CCE}(S_{uss}(j)))$ the cardinality of $V_{CCE}(S_{uss}(j))$ where the non-overlapping CCEs for search space set $S_{uss}(j)$ are determined considering the allocated PDCCH candidates for monitoring for the CSS sets and the allocated PDCCH candidates for monitoring for all search space sets $S_{uss}(k)$, $0 \le k \le j$.

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\sum_L M_{S_{uss}(j)}^{(L)} \le M_{PDCCH}^{uss}$ AND $C(V_{CCE}(S_{uss}(j))) \le C_{PDCCH}^{uss}$
   allocate $\sum_L M_{S_{uss}(j)}^{(L)}$ PDCCH candidates for monitoring to USS set $S_{uss}(j)$
   $M_{PDCCH}^{uss} = M_{PDCCH}^{uss} - \sum_L M_{S_{uss}(j)}^{(L)}$;
   $C_{PDCCH}^{uss} = C_{PDCCH}^{uss} - C(V_{CCE}(S_{uss}(j)))$;
   j = j + 1 ;
end while
End procedure Various embodiments of the present disclosure enable a limit to be maintained for a number of sizes of DCI formats with CRC scrambled by C-RNTI that a UE expects to detect per cell when the UE is configured for communication with more than one TRPs on the cell. For example, a maximum of four sizes of DCI formats, that include up to three sizes of DCI formats with CRC scrambled by C-RNTI, per serving cell for the UE when the UE is configured for communication with more than one TRPs on the serving cell, can be maintained. In order to maintain the four sizes of DCI formats, the sizes of the DCI formats that the UE detects in PDCCH receptions from the more than one TRPs fulfill a set of restrictions.

When the UE is configured for communication with more than one TRPs on a cell, a DCI format scheduling, for example, PDSCH receptions to the UE provide parameters associated with one PDSCH reception from one TRP or with more than one PDSCH receptions from respective more than one TRPs. When the DCI format schedules a PDSCH reception from one TRP, the UE can be configured with a same size for the DCI format for PDCCH monitoring on each TRP scheduling PDSCH reception on the active DL BWP of the cell. When the DCI format schedules a PDSCH reception from more than one TRPs, the DCI format does not have a same size as a DCI format scheduling PDSCH reception from a single TRP on the active DL BWP of the cell because scheduling information for more than one PDSCH receptions is provided. For example, when the UE is not configured for communication with multiple TRPs, the UE can be configured with search space sets for monitoring a DCI format 0_0 for scheduling a PDSCH reception, and a DCI format 0_0 for scheduling PUSCH transmission, and search space sets for monitoring a DCI format 1_1, and a DCI format 0_1 for scheduling of PUSCH transmission, for scheduling a PDSCH reception on the active DL BWP of the cell. A DCI format scheduling PDSCH receptions to the UE from multiple TRPs, referred to as DCI format 1_2, has a larger size than the other DCI formats that the UE monitors associated PDCCH for PDSCH receptions or PUSCH transmissions. Accordingly, various embodiments of the present disclosure recognize and consider the advantages of avoiding increasing a number of DCI formats with CRC scrambled by a C-RNTI.

In one embodiment, a UE, such as the UE 116, is provided a separate search space configuration for DCI format 1_2. DCI format 1_2 has a larger size that other DCI formats, and therefore uses a different distribution of PDCCH candidates per CCE aggregation level. In addition, a network can choose to schedule multiple PDSCH receptions by the UE from corresponding multiple TRPs using DCI format 1_2 with a different periodicity than to schedule a single PDSCH reception by the UE from a corresponding single TRP using DCI format 0_1 or DCI format 1_1, which would use a different periodicity for PDCCH monitoring in the corresponding search space sets. In order to avoid increasing a number of sizes for DCI formats with CRC scrambled by a C-RNTI that the UE uses to monitor corresponding PDCCH candidates per slot for the cell, the UE can apply zero padding to DCI format 1_1 when DCI format 1_1 has a smaller size than DCI format 0_1, or apply zero padding to DCI format 0_1 when DCI format 0_1 has a smaller size than DCI format 1_1, so that DCI format 0_1 and DCI format 1_1 have a same size. As an alternative, when DCI format 1_1 has a larger size that DCI format 0_1, the UE may not monitor PDCCH for DCI format 1_1 and padding is not used for DCI format 0_1.

In another embodiment, a UE, such as the UE 116, monitors PDCCH for DCI format 1_2 in a same search space set as for DCI format 0_1. When the UE monitors DCI format 1_2, the UE may not also monitor DCI format 1_1. Likewise, when the UE monitors DCI format 1_1, the UE may not also monitor DCI format 1_2. For example, the search space set configuration can include an indication, or flag, from whether the UE monitors PDCCH for DCI format 1_1 or for DCI format 1_2 or the UE always monitors DCI format 1_2 and does not monitor DCI format 1_1 when the UE is configured to monitor DCI format 1_2. The indication can be included to avoid increasing a number of search space sets for monitoring PDCCH by the UE, particularly when a size difference between DCI format 1_2 and DCI format 0_1 is not too large to require a different distribution of PDCCH candidates per CCE aggregation level.

Figure 9:
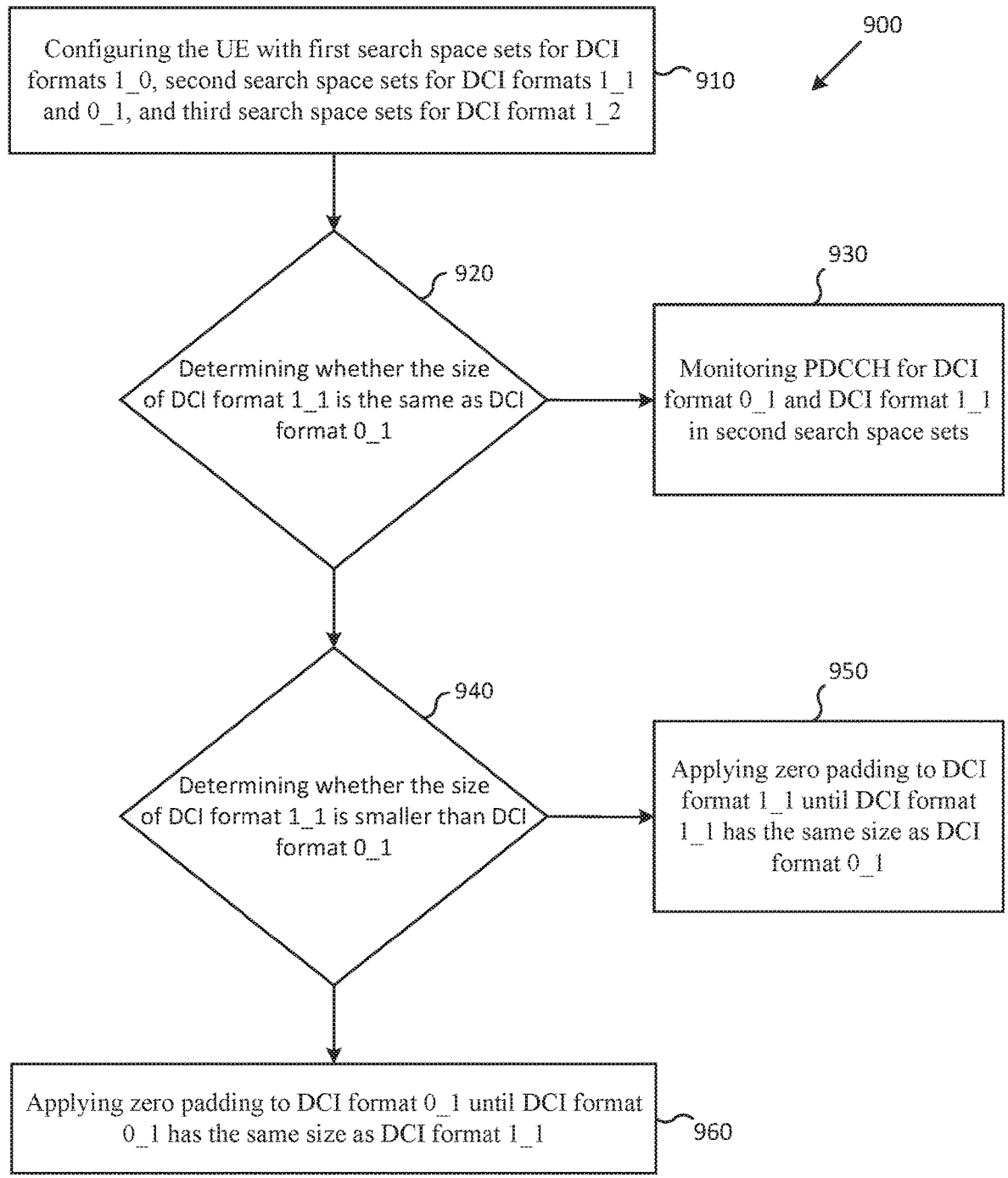
FIG. 9 illustrates a method of monitoring PDCCH for a DCI format according to various embodiments of the present disclosure.

For example, FIG. 9 illustrates a method of monitoring PDCCH for a DCI format according to various embodiments of the present disclosure. More particularly, FIG. 9 illustrates a method of monitoring PDCCH for a DCI format scheduling multiple PDSCH receptions from respective multiple TRPs according to various embodiments of the present disclosure. Although described herein as being implemented by the UE 116, the method 900 illustrated in FIG. 9 can be implemented by one or more of the UEs 111-116 and a corresponding method can be performed by one or more of the gNBs 101-103 described in FIG. 1. Other embodiments can be used without departing from the scope of the present disclosure. In various embodiments, the UE 116 can perform the method 900 to monitor downlink channels for communication with multiple TRPs.

In operation 910, a UE, such as the UE 116, is provided with separate configurations for first search space sets to monitor PDCCH for DCI format 1_0 and a DCI format 0_0, second search space sets to monitor PDCCH for DCI format 1_1 and DCI format 0_1, and third search space sets to monitor PDCCH for DCI format 1_2. In various embodiments, DCI format 1_0 or DCI format 1_1 schedules PDSCH reception from a single TRP while DCI format 1_2 schedules PDSCH receptions from multiple TRPs.

In operation 920, the UE 116 determines whether the size of DCI format 1_1 is the same as the size of DCI format 0_1. If the sizes of DCI format 1_1 and DCI format 0_1 are the same, the UE 116 proceeds to operation 930. In operation 930, the UE 116 monitors the PDCCH for DCI format 1_1 and DCI format 0_1 in the second search space sets. If the UE 116 determines, in operation 920, that the sizes of DCI format 1_1 and DCI format 0_1 are not the same, the UE 116 proceeds to operation 940.

In operation 940, the UE 116 determines whether the size of DCI format 1_1 is smaller than the size of DCI format 0_1. If the UE 116 determines the size of DCI format 1_1 is smaller than the size of DCI format 0_1, the UE 116 proceeds to operation 950. In operation 950, the UE 116 applies zero padding to DCI format 1_1 until DCI format 1_1 has same size as DCI format 0_1 and monitors PDCCH for DCI format 1_1 and DCI format 0_1 in the second search space sets.

If the UE 116 determines, in operation 940, that the size of DCI format 1_1 is not smaller than the size of DCI format 0_1, the UE 116 proceeds to operation 960. In operation 960, the UE 116 applies zero padding to DCI format 0_1 until DCI format 0_1 has same size as DCI format 1_1 monitors PDCCH for DCI format 1_1 and DCI format 0_1 in the second search space sets.

In various embodiments, padding of the DCI format results in an unnecessary size increase for the DCI format that inevitably results to a lower reception reliability for the DCI format or a larger resource overhead for a given reception reliability for the DCI format. The UE 116 with a capability to communicate with multiple TRPs may also be able to monitor PDCCH for a number of sizes of DCI formats with CRC scrambled by C-RNTI that is larger than a minimum predetermined size. The UE 116 can report the capability for the number of sizes of DCI formats with CRC scrambled by C-RNTI that the UE 116 can monitor PDCCH per cell to a serving gNB. Based on that reported UE capability, the gNB 102 can determine not to apply zero padding to one or more DCI formats with CRC scrambled by C-RNTI in order to operate with a number of corresponding sizes that is equal to the predetermined minimum number for the UE 116.

Various embodiments of the present disclosure recognize and consider that a set of TRPs or a set of transmission parameters associated with TRPs that a UE, such as UE 116, is configured for communication can be adapted based on an indication by a DCI format. For example, UE 116 can monitor PDCCH in a CSS set or in a USS set. For example, the CSS set or the USS set can be associated with CORESET 0. A PDCCH can convey a DCI format that provides an indication for parameters associated with PDCCH receptions in CORESETs corresponding to a set of TRPs. For example, the UE 116 can be configured a field in the DCI format for indicating such parameters for each cell or for each group of cells where the UE is configured multiple TRPs. The parameters can include an indication for whether or not the UE 116 is expected to monitor PDCCH reception from a TRP from the set of TRPs. The DCI format can provide additional functionalities, such as an indication for whether or not the UE 116 is expected to monitor PDCCH in search space sets at next DRX cycles. The UE 116 can monitor PDCCH for the DCI format outside Active Time or within Active Time of a DRX cycle.

In some embodiments, the UE 116 monitors PDCCH candidates for a DCI format providing an adaptation for parameters of PDCCH receptions in CORESETs associated with a set of TRPs in one or more CSS sets or in one or more USS sets associated with one or more TRPs from the set of TRPs. The UE 116 can monitor PDCCH for the DCI format in CSS sets in various ways. For example, the UE 116 can monitor PDCCH for the DCI format in a CSS set with a lowest index for a TRP with a lowest index (first TRP) in the set of TRPs. As another example, the UE 116 can monitor PDCCH for the DCI format in a separately configured CSS set for a TRP with a lowest index in the set of TRPs. As yet another example, the UE 116 can monitor PDCCH for the DCI format in a configured or predetermined number of CSS sets for a corresponding number of TRPs, such as the TRPs with the smaller indexes, in the set of TRPs.

The DCI format that provides an adaptation of PDCCH transmission parameters for a set of TRPs, can include a variety of information. For example, the DCI format can include a bitmap activating or deactivating all PDCCH receptions, PDCCH receptions for some or all CSS sets, or PDCCH receptions for some or all USS sets, for a subset of TRPs from the set of TRPs for each cell or for each group of cells where the UE in configured to monitor PDCCH from multiple TRPs. In some embodiments, instead of including a bitmap, a field in the DCI format can indicate a subset of TRPs from the set of TRPs. For example, a field of 2 bits can indicate all TRPs in the set of TRPs, no TRPs in the set of TRPs except for a predetermined TRP, a first configured subset of TRPs or a second configured subset of TRPs for a corresponding cell. In some embodiments, the subset of TRPs can be the same as the set of TRPs. In other embodiments, the subset of TRPs can include configured or predetermined TRP indexes that can include all TRPs in the set of TRPs, except the TRP with the lowest index (first TRP) that the UE 116 considers always activated unless deactivated by higher layer signaling. In still other embodiments, the subset of TRPs can include all TRP indexes other than the indexes of TRPs that the UE 116 is configured to monitor PDCCH for the DCI format.

In some embodiments, the DCI format can include TCI states for one or more CORESETs of one or more TRPs. For example, the information can update the TCI states for configured or predetermined CORESETs or the TCI states for CORESETs associated with predetermined or configured search space sets. For example, the DCI format can be provided by a PDCCH received in CORESET 0 and the TCI state of CORESET 0 is not updated. The DCI format can update TCI states of CORESETs for multiple scheduling cells. An association between a field in the DCI format providing a TCI state and a CORESET index can be provided by higher layers to UE 116 for each corresponding index of a scheduling cell.

In some embodiments, the DCI format can include CCE-to-REG mapping parameters or a precoder granularity for one or more CORESETs of one or more TRPs. In other embodiments, a mapping can be configured in advance between CCE-to-REG mapping parameters and TCI states or between precoder granularity and TCI states.

In some embodiments, the DCI format can include an adaptation to CSS sets or USS sets such as an activation or deactivation of configured CSS sets or USS sets or an indication of a configuration, for a preconfigured set of configurations, for CSS sets or USS sets such as a configuration for a number of PDCCH candidates per CCE aggregation level, a PDCCH monitoring periodicity, and so on.

By enabling an adaptation of activated or deactivated TRPs or an adaptation of parameters for CORESETs of TRPs or of search space sets of TRPs, a network can quickly adapt transmissions to the UE depending on changing channel characteristics. The channel characteristics can change due to UE mobility or interference that causes a preferable set of TRPs or a set of preferable TCI states for a corresponding set of CORESETs for a set of TRPs to vary in time. When the UE 116 fails to detect the DCI format, the UE 116 can either skip PDCCH monitoring until the next PDCCH monitoring occasion for the DCI format, or monitor PDCCH only for TRPs that cannot be deactivated, or monitor PDCCH for same TRPs as prior to the PDCCH monitoring occasion for the DCI format.

Figure 10:
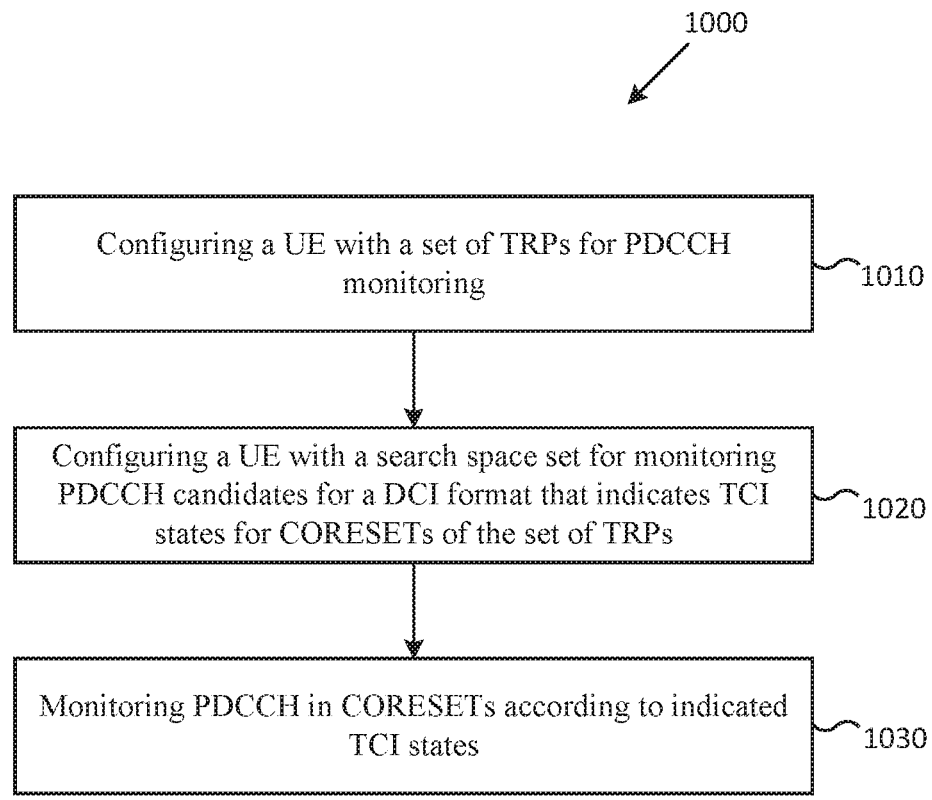
FIG. 10 illustrates a method of determining TCI states for CORESETs of a set of TRPs according to various embodiments of the present disclosure.

For example, FIG. 10 illustrates a method of determining TCI states for CORESETs of a set of TRPs according to various embodiments of the present disclosure. More specifically, FIG. 10 illustrates a method of determining TCI states for CORESETs of a set of TRPs based on an indication from a DCI format according to various embodiments of the present disclosure. Although described herein as being implemented by the UE 116, the method 1000 illustrated in FIG. 10 can be implemented by one or more of the UEs 111-116 and a corresponding method can be performed by one or more of the gNBs 101-103 described in FIG. 1. Other embodiments can be used without departing from the scope of the present disclosure. In various embodiments, the UE 116 can perform the method 1000 to monitor downlink channels for communication with multiple TRPs.

In operation 1010, a UE, such as the UE 116, is configured with a set of TRPs for PDCCH monitoring. In some embodiments, the configuration of the set of TRPs can include a set of TRP indexes and a configuration of search space sets and associated CORESETs for the TRP indexes.

In operation 1020, the UE 116 is configured with a search space set for monitoring PDCCH candidates for a DCI format that indicates TCI states for CORESETs of the set of TRPs. In various embodiments, the DCI format can adapt other parameters of the CORESETs such as a number of resource blocks, CCE-to-REG mapping parameters, or a precoder granularity for one or more CORESETs. In some embodiments, the other parameters can have a configuration mapping to the TCI state.

In operation 1030, after UE 116 detects the DCI format, the UE 116 can monitor PDCCH in the CORESETs according to the indicated TCI states. In some embodiments, a time interval can also be defined between the end of the CORESET where the UE 116 receives the PDCCH with the DCI format until a time where the UE 116 applies an indicated TCI state for a CORESET when it is different than a TCI state for the CORESET prior to the DCI format detection.

In some embodiments, instead of an indication for activation/deactivation of PDCCH monitoring in one or more TRPs being provided by a DCI format, the indication can be provided by a MAC control element (MAC CE). This can also be the case for other parameters associated with PDCCH monitoring, such as for TCI states of corresponding CORESETs.

In some embodiments, the UE 116 can determine a number of PDCCH candidates or a number of non-overlapping CCEs per cell per slot for allocation to search space sets based on the TRPs from a set of TRPs where the UE 116 is indicated to monitor PDCCH. For example, the UE 116 may not consider allocation of PDCCH candidates or of non-overlapping CCEs in TRPs of a cell where the UE 116 is indicated, by a DCI format or by a MAC CE, to not monitor PDCCH. Then, instead of determining allocation of PDCCH candidates or of non-overlapping CCEs based on configured cells or TRPs, the determination is based on activated cells or TRPs. As another example, TRPs of a cell where the UE 116 is indicated, by a DCI format or by a MAC CE, to not monitor PDCCH are not considered in determining $N_{TRPs}^{DL,\mu}$ or in determining $N_{TRP}^{c,j}$. For example, $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} (N_{cells,active,0}^{DL,j} + 2 \cdot N_{cells,active,1}^{DL,j}) \rfloor$ and $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} (N_{cells,active,0}^{DL,j} + 2 \cdot N_{cells,active,1}^{DL,j}) \rfloor$ where $N_{cells,active,0}^{DL,j}$ and $N_{cells,active,1}^{DL,j}$ are respectively the number of cells where the UE is indicated to monitor PDCCH in CORESETs with TRP index 0 and in CORESETs with TRP index 1.

Although the present disclosure has been described with an example embodiment, various changes and modifications can be suggested by or to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transmitter configured to transmit a first capability value;
a receiver configured to receive:
  a configuration of $N_{cells}^{DL,\mu}$ downlink cells scheduled by physical downlink control channels (PDCCHs) with a sub-carrier spacing (SCS) configuration $\mu$; and
  a configuration of a first group index for first control resource sets (CORESETs) and of a second group index for second CORESETs per cell for $N_{cells,1}^{DL,\mu}$ from the $N_{cells}^{DL,\mu}$; and
a processor, operably connected to the receiver, configured to determine a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ for each SCS configuration $\mu$, where $N_{cells,0}^{DL,\mu} = N_{cells}^{DL,\mu} - N_{cells,1}^{DL,\mu}$;
wherein the receiver is further configured to receive, per cell from the $N_{cells}^{DL,\mu}$ cells and per slot, a number of PDCCH candidates that is not larger than a minimum of:
  the total number $M_{PDCCH}^{total,slot,\mu}$ of PDCCH candidates per slot, and
  a maximum predefined number $M_{PDCCH}^{max,slot,\mu}$ of PDCCH candidates per slot.

2. The UE of claim 1, wherein:
the transmitter is further configured to transmit a second capability value $N_{cells}^{cap}$, and
$M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$, where $\Sigma_{j=0}^{3} N_{cells}^{DL,j} > 4$.

3. The UE of claim 1, wherein:
the transmitter is further configured to transmit a second capability value $N_{cells}^{cap}$, and
$M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} (N_{cells,0}^{DL,j} + 2 \cdot N_{cells,1}^{DL,j}) \rfloor$, where $\Sigma_{j=0}^{3} N_{cells}^{DL,j} > 4$.

4. The UE of claim 1, wherein:
a maximum number of CORESETs in any of the $N_{cells,0}^{DL,\mu}$ cells is three including a CORESET with index 0; and
for the $N_{cells,1}^{DL,\mu}$ cells, a maximum number of CORESETs in any of the $N_{cells,1}^{DL,\mu}$ cells is five where:
  a maximum number of first CORESETs is three including a CORESET with index 0, and
  a maximum number of second CORESETs is three including a CORESET with index 0.

5. The UE of claim 1, wherein the receiver is further configured to receive:
first PDCCH candidates in first CORESETs of a first cell,
second PDCCH candidates in first CORESETs of a second cell, and
a physical downlink shared channel (PDSCH) on the second cell that is scheduled by a downlink control information (DCI) format provided either by a PDCCH candidate from the first PDCCH candidates or by a PDCCH candidate from the second PDCCH candidates.

6. The UE of claim 1, wherein:
the receiver is further configured to receive a PDCCH that provides a downlink control information (DCI) format;
the processor is further configured to determine, based on a field of the DCI format, a transmission configuration indication (TCI) state for each of the second CORESETs of a cell from the $N_{cells,1}^{DL,\mu}$ cells; and
the receiver is further configured to receive PDCCHs in a CORESET from the second CORESETs of the cell according to the determined TCI state.

7. The UE of claim 6, wherein the PDCCH is received in a CORESET from the first CORESETs or in a CORESET with index 0.

8. A base station comprising:
a receiver configured to receive a first capability value;
a transmitter configured to transmit:
  a configuration of $N_{cells}^{DL,\mu}$ downlink cells scheduled by physical downlink control channels (PDCCHs) with a sub-carrier spacing (SCS) configuration $\mu$; and
  a configuration of a first group index for first control resource sets (CORESETs) and of a second group index for second CORESETs per cell for $N_{cells,1}^{DL,\mu}$ cells from the $N_{cells}^{DL,\mu}$; and
a processor, operably connected to the transmitter, configured to determine a total number $M_{PDCCH}^{total,slot,\mu}$ of PDCCH candidates per slot based on the first capability value, a number of the $N_{cells,1}^{DL,\mu}$ cells, and a number of $N_{cells,0}^{DL,\mu}$ for each SCS configuration $\mu$, where $N_{cells,0}^{DL,\mu} = N_{cells}^{DL,\mu} - N_{cells,1}^{DL,\mu}$.

9. The base station of claim 8, wherein:
a maximum number of CORESETs in any of the $N_{cells,0}^{DL,\mu}$ cells is three including a CORESET with index 0; and
for the $N_{cells,1}^{DL,\mu}$ cells, a maximum number of CORESETs in any of the $N_{cells,1}^{DL,\mu}$ cells is five where:
  a maximum number of first CORESETs is three including a CORESET with index 0, and
  a maximum number of second CORESETs is three including a CORESET with index 0.

10. The base station of claim 8, wherein the transmitter is further configured to transmit:
first PDCCH candidates in first CORESETs of a first cell,
second PDCCH candidates in first CORESETs of a second cell, and
a physical downlink shared channel (PDSCH) on the second cell that is scheduled by a downlink control information (DCI) format provided either by a PDCCH candidate from the first PDCCH candidates or by a PDCCH candidate from the second PDCCH candidates.

11. The base station of claim 8, wherein:
the processor is further configured to include, in a field of a downlink control information (DCI) format, an indication for enabling PDCCH receptions in the second CORESETs of a cell from the $N_{cells,1}^{DL,\mu}$ cells;
the transmitter is further configured to:
  transmit a PDCCH that provides the DCI format; and
  transmit PDCCHs in the second CORESETs of the cell based on the indication.

12. The base station of claim 8, wherein:
the processor is further configured to include, in a field of a downlink control information (DCI) format, an indication of a transmission configuration indication (TCI) state for each of the second CORESETs of a cell from the $N_{cells,1}^{DL,\mu}$ cells,
the transmitter is further configured to:
  transmit a PDCCH that provides the DCI format; and
  transmit PDCCHs in a CORESET from the second CORESETs of the cell according to the indicated TCI state.

13. The base station of claim 12, wherein the PDCCH is transmitted in a CORESET from the first CORESETs or in a CORESET with index 0.

14. A method for a user equipment (UE) to determine a maximum number of PDCCH candidates to receive per cell and per slot, the method comprising:
transmitting a first capability value;
receiving:
   a configuration of $N_{cells}^{DL,\mu}$ downlink cells scheduled by physical downlink control channels (PDCCHs) with a sub-carrier spacing (SCS) configuration $\mu$; and
   a configuration of a first group index for first control resource sets (CORESETs) and of a second group index for second CORESETs per cell for $N_{cells,1}^{DL,\mu}$ from the $N_{cells}^{DL,\mu}$;
determining a total number $M_{PDCCH}^{total,slot,\mu}$ of PDCCH candidates per slot based on the first value, a number of the $N_{cells,1}^{DL,\mu}$ cells, and a number of $N_{cells,0}^{DL,\mu}$ cells for each SCS configuration $\mu$, where $N_{cells,0}^{DL,\mu}=N_{cells}^{DL,\mu}-N_{cells,1}^{DL,\mu}$; and
receiving, per cell from the $N_{cells}^{DL,\mu}$ cells and per slot, a number of PDCCH candidates that is not larger than the minimum of:
   the total number $M_{PDCCH}^{total,slot,\mu}$ of PDCCH candidates per slot, and
   a maximum predefined number $M_{PDCCH}^{max,slot,\mu}$ of PDCCH candidates per slot.

15. The method of claim 14, further comprising:
transmitting a second capability value $N_{cells}^{cap}$, and $M_{PDCCH}^{total,slot,\mu}=\lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$, where $\Sigma_{j=0}^{3} N_{cells}^{DL,j} > 4$.

16. The method of claim 14, further comprising:
transmitting a second capability value $N_{cells}^{cap}$, and $M_{PDCCH}^{total,slot,\mu}=\lfloor N_{cells}^{cap} \cdot M_{PDCCH}^{max,slot,\mu} \cdot N_{cells}^{DL,\mu} / \Sigma_{j=0}^{3} (N_{cells,0}^{DL,j}+2 \cdot N_{cells,1}^{DL,j}) \rfloor$, where $\Sigma_{j=0}^{3} N_{cells}^{DL,j} > 4$.

17. The method of claim 14, wherein:
a maximum number of CORESETs in any of the $N_{cells,0}^{DL,\mu}$ cells is three including a CORESET with index 0; and
for the $N_{cells}^{DL,\mu}$ cells, a maximum number of CORESETs in any of the $N_{cells,1}^{DL,\mu}$ cells is five where:
   a maximum number of first CORESETs is three including a CORESET with index 0, and
   a maximum number of second CORESETs is three including a CORESET with index 0.

18. The method of claim 14, further comprising receiving:
first PDCCH candidates in first CORESETs of a first cell,
second PDCCH candidates in first CORESETs of a second cell, and
a physical downlink shared channel (PDSCH) on the second cell that is scheduled by a downlink control information (DCI) format provided either by a PDCCH candidate from the first PDCCH candidates or by a PDCCH candidate from the second PDCCH candidates.

19. The method of claim 14, further comprising:
receiving a PDCCH that provides a downlink control information (DCI) format;
determining, based on a field of the DCI format, a transmission configuration indication (TCI) state for each of the second CORESETs of a cell from the $N_{cells,1}^{DL,\mu}$ cells; and
receiving PDCCHs in a CORESET from the second CORESETs of the cell according to the determined TCI state.

20. The method of claim 19, wherein the PDCCH reception is in a CORESET from the first CORESETs or in a CORESET with index 0.

* * * * *